US009420257B2

(12) United States Patent  (10) Patent No.: US 9,420,257 B2
Seol  (45) Date of Patent: Aug. 16, 2016

(54) MOBILE TERMINAL AND METHOD FOR ADJUSTING AND DISPLAYING A STEREOSCOPIC IMAGE

(75) Inventor: Yunhwan Seol, Seoul (KR)

(73) Assignee: LG ELECTRONICS INC., Seoul (KR)

(*) Notice: Subject to any disclaimer, the term of this patent is extended or adjusted under 35 U.S.C. 154(b) by 985 days.

(21) Appl. No.: 13/053,035

(22) Filed: Mar. 21, 2011

(65) Prior Publication Data

US 2012/0013605 A1  Jan. 19, 2012

(30) Foreign Application Priority Data

Jul. 14, 2010  (KR) .................. 10-2010-0067815

(51) Int. Cl.
  *H04N 13/00* (2006.01)
  *H04N 13/04* (2006.01)
(52) U.S. Cl.
  CPC ....... *H04N 13/0033* (2013.01); *H04N 13/0022* (2013.01); *H04N 13/0404* (2013.01); *H04N 13/0409* (2013.01); *H04N 13/0434* (2013.01); *H04N 13/0438* (2013.01)
(58) Field of Classification Search
  CPC .................. H04N 13/0022; G06T 2207/10012
  USPC ........................................................ 715/848
  See application file for complete search history.

(56) References Cited

U.S. PATENT DOCUMENTS

| 4,925,294 | A | * | 5/1990 | Geshwind et al. | ............... 352/57 |
| 5,682,437 | A | * | 10/1997 | Okino et al. | ................... 382/100 |
| 5,717,415 | A | * | 2/1998 | Iue et al. | ........................... 345/8 |
| 5,760,933 | A | * | 6/1998 | Aritake et al. | .................. 359/22 |
| 6,208,348 | B1 | * | 3/2001 | Kaye | ...................... G03B 35/16 |
| | | | | | 345/419 |
| 2002/0008906 | A1 | * | 1/2002 | Tomita | .......................... 359/462 |
| 2002/0009137 | A1 | * | 1/2002 | Nelson et al. | .............. 375/240.1 |

(Continued)

FOREIGN PATENT DOCUMENTS

EP   2107816 A2 * 10/2009 ............. H04N 13/00
WO  WO 9641311 A2 * 12/1996

(Continued)

OTHER PUBLICATIONS

Zhang et al., "Stereoscopic Image Generation Based on Depth Images for 3D TV", IEEE Transactions on Broadcasting, v. 51, n. 2, pp. 191-199, Jun. 2005.*

(Continued)

*Primary Examiner* — Jennifer To
*Assistant Examiner* — Joseph R Burwell
(74) *Attorney, Agent, or Firm* — Lee, Hong, Degerman, Kang & Waimey PC; Jonathan Kang; Justin Lee

(57) ABSTRACT

A mobile terminal includes a controller and a display configured to display a stereoscopic image comprising a first image provided to a left eye and a second image provided to a right eye. The controller searches for a plurality of objects within the first image and the second image, wherein each of the plurality of objects is correspondingly present in both the first image and in the second image to form a stereoscopic image; calculates a separation distance for each object; changes only a position of a selected object of each of the first and second images when the calculated separation distance for the selected object is equal to or greater than a threshold value to decrease the separation distance for the selected object to less than the threshold value; and causes the display to display the changed first and second images.

15 Claims, 17 Drawing Sheets

(56) References Cited

U.S. PATENT DOCUMENTS

| | | |
|---|---|---|
| 2005/0190180 A1* | 9/2005 | Jin et al. .......................... 345/419 |
| 2005/0254702 A1 | 11/2005 | Era |
| 2007/0047040 A1 | 3/2007 | Ha |
| 2007/0103465 A1* | 5/2007 | Barenbrug ............ G06T 15/005 345/426 |
| 2007/0236493 A1* | 10/2007 | Horiuchi et al. .............. 345/419 |
| 2008/0199046 A1 | 8/2008 | Sasagawa et al. |
| 2008/0231691 A1* | 9/2008 | Larson ............................ 348/56 |
| 2008/0240549 A1* | 10/2008 | Koo et al. ...................... 382/154 |
| 2009/0016640 A1* | 1/2009 | Klein Gunnewiek ... G06T 5/005 382/276 |
| 2009/0116732 A1* | 5/2009 | Zhou et al. .................... 382/154 |
| 2010/0142824 A1* | 6/2010 | Lu .................................. 382/195 |
| 2010/0171697 A1* | 7/2010 | Son et al. ....................... 345/158 |
| 2010/0201790 A1* | 8/2010 | Son et al. ......................... 348/53 |
| 2010/0220175 A1* | 9/2010 | Claydon et al. ................. 348/43 |
| 2011/0157311 A1* | 6/2011 | Angot ................ H04N 13/0011 348/46 |
| 2011/0221866 A1* | 9/2011 | Ohta ............................... 348/46 |
| 2011/0254844 A1* | 10/2011 | Hatakeda et al. ............. 345/426 |
| 2011/0304690 A1* | 12/2011 | Kang et al. ...................... 348/43 |
| 2011/0304691 A1* | 12/2011 | Newton et al. ................... 348/43 |
| 2012/0038625 A1* | 2/2012 | Kim ............................... 345/419 |
| 2012/0068998 A1* | 3/2012 | Hong ............................. 345/419 |
| 2012/0075291 A1* | 3/2012 | Sohn ............................. 345/419 |
| 2012/0092457 A1* | 4/2012 | Sugino et al. ................... 348/46 |
| 2012/0102435 A1* | 4/2012 | Han et al. ...................... 715/848 |
| 2012/0105611 A1* | 5/2012 | Godar ............................. 348/54 |
| 2012/0120195 A1* | 5/2012 | Shows et al. .................... 348/46 |
| 2012/0127265 A1* | 5/2012 | Chang et al. .................... 348/42 |
| 2012/0188226 A1* | 7/2012 | Bu et al. ........................ 345/419 |
| 2012/0212586 A1* | 8/2012 | Li et al. ........................... 348/47 |
| 2013/0093849 A1* | 4/2013 | He et al. .......................... 348/43 |

FOREIGN PATENT DOCUMENTS

| | | | |
|---|---|---|---|
| WO | WO 9724000 A1 * | 7/1997 | ............ H04N 13/00 |
| WO | 9912127 | 3/1999 | |

OTHER PUBLICATIONS

European Patent Office Application Serial No. 11159862.9, Search Report dated Sep. 26, 2012, 7 pages.

* cited by examiner

FIG. 6
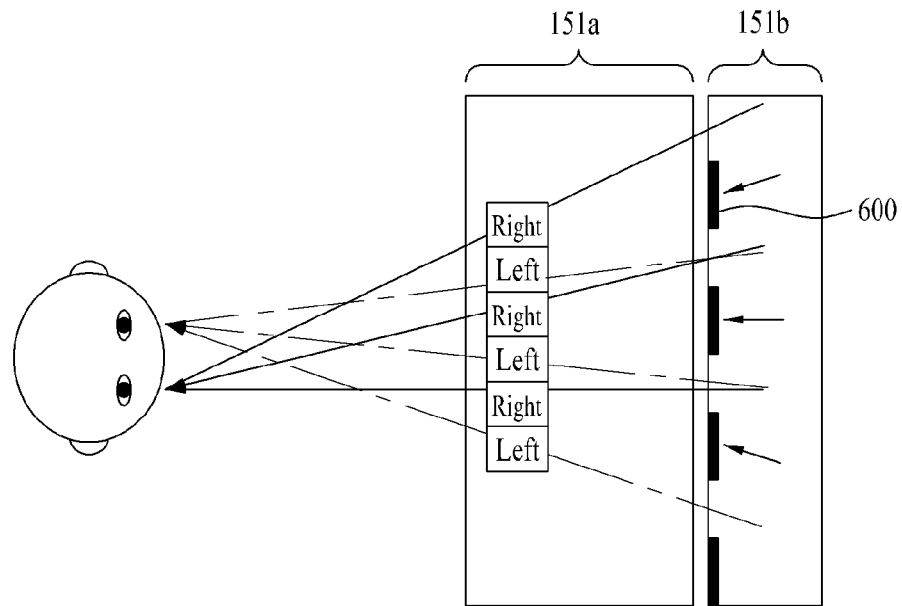
(a)
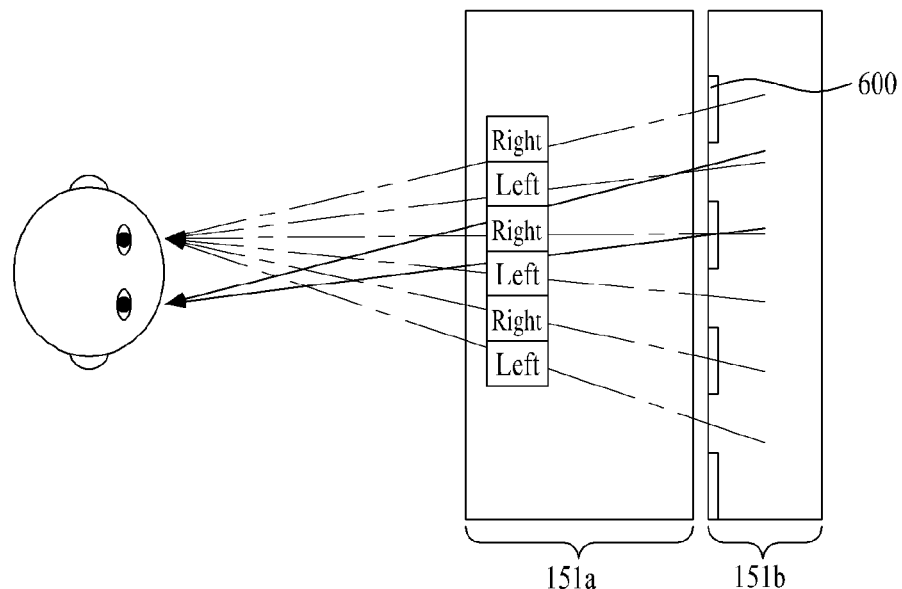
(b)

FIG. 7
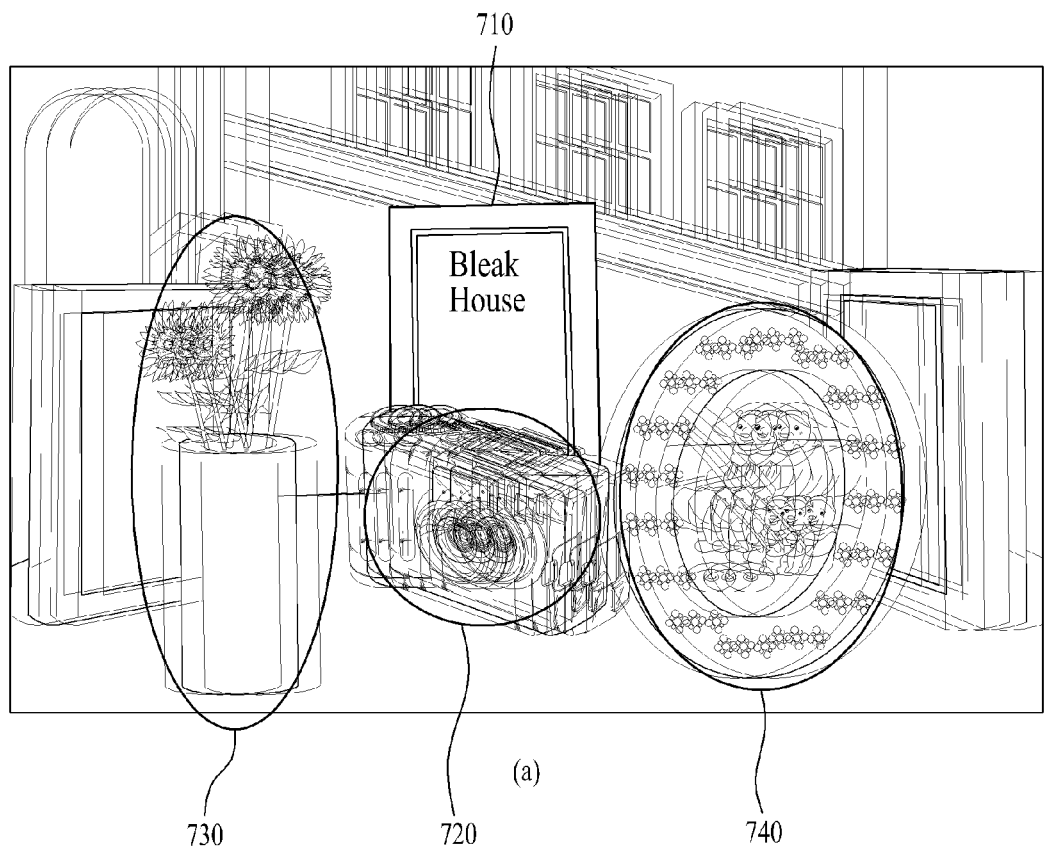
(a)
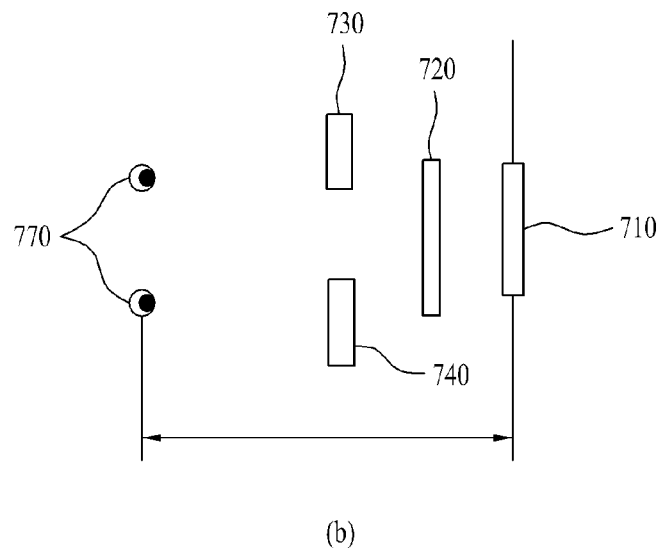
(b)

FIG. 9
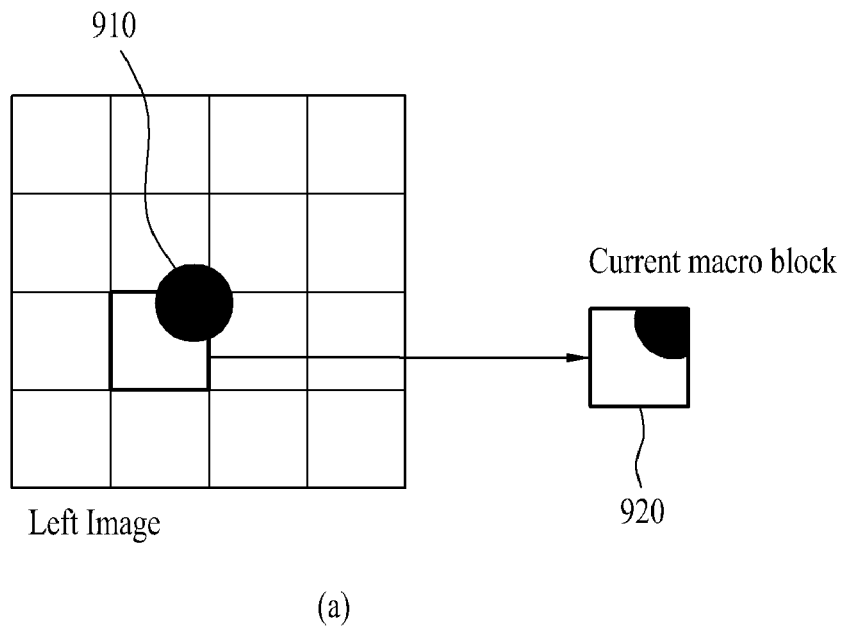
(a)
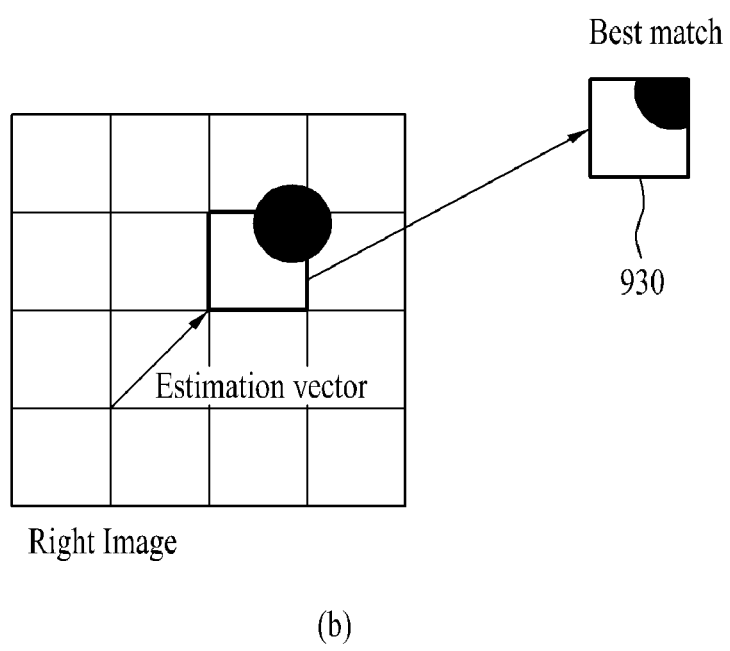
(b)

FIG. 11
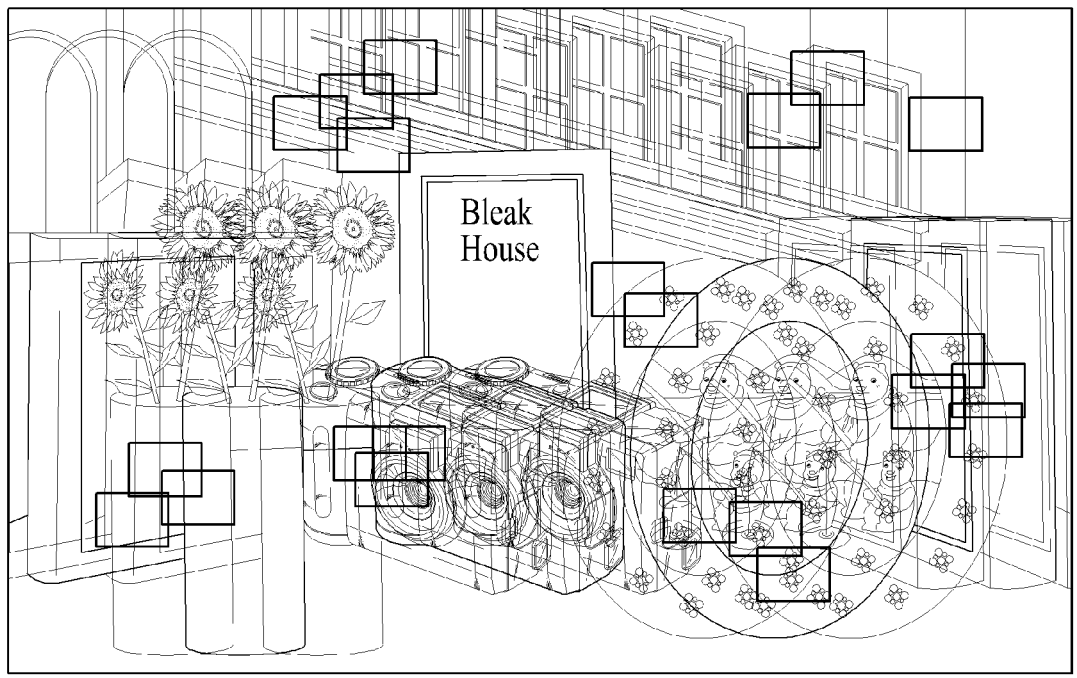
(a)
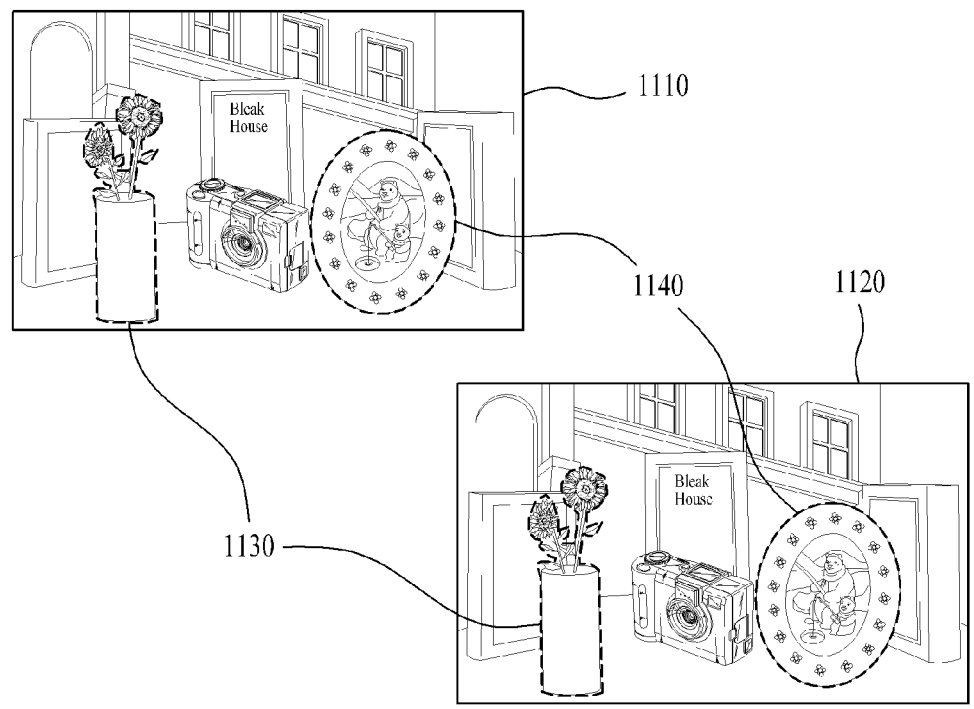
(b)

FIG. 12
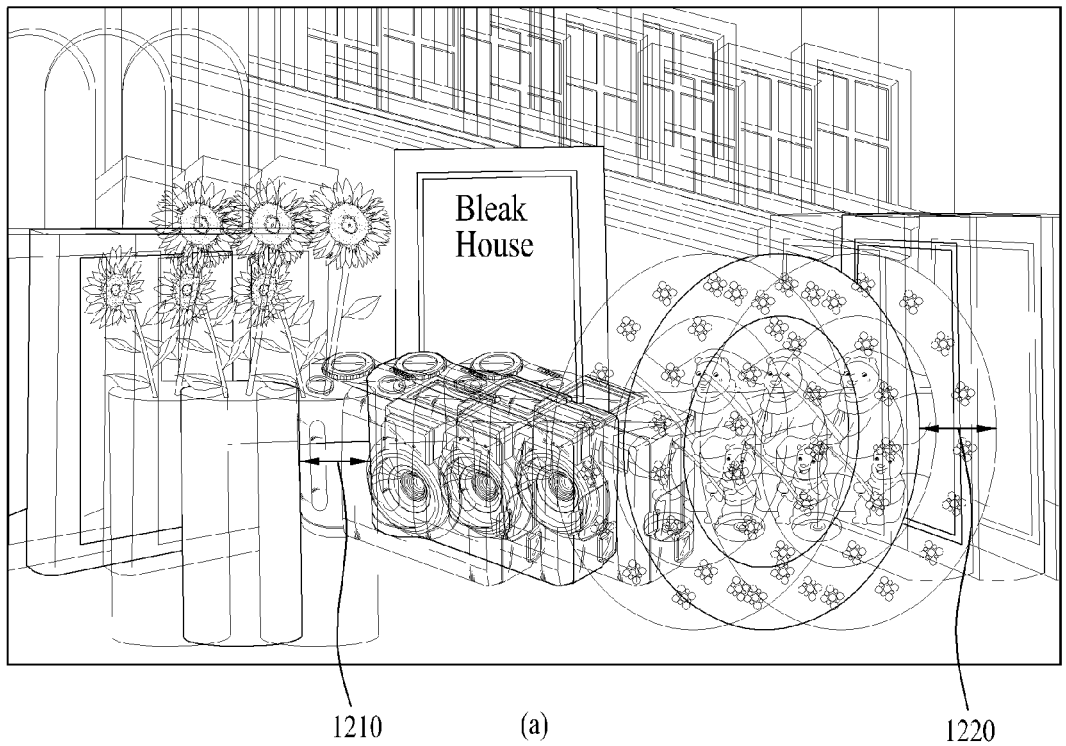
1210      (a)      1220
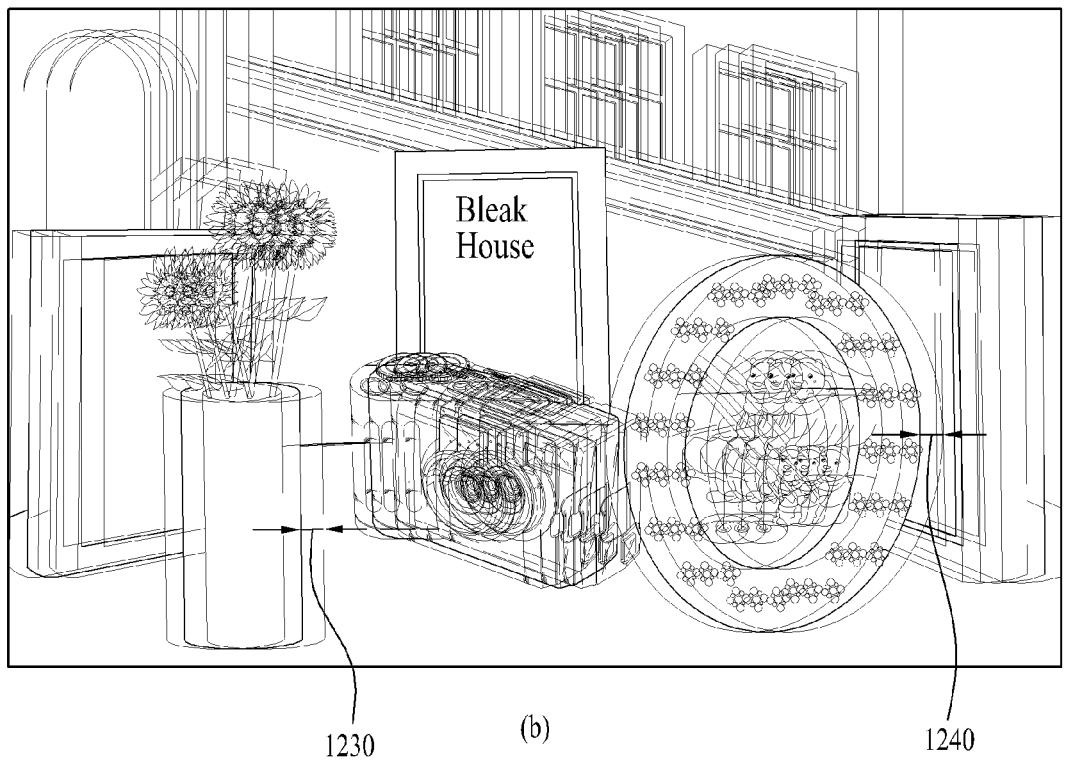
1230      (b)      1240

FIG. 13
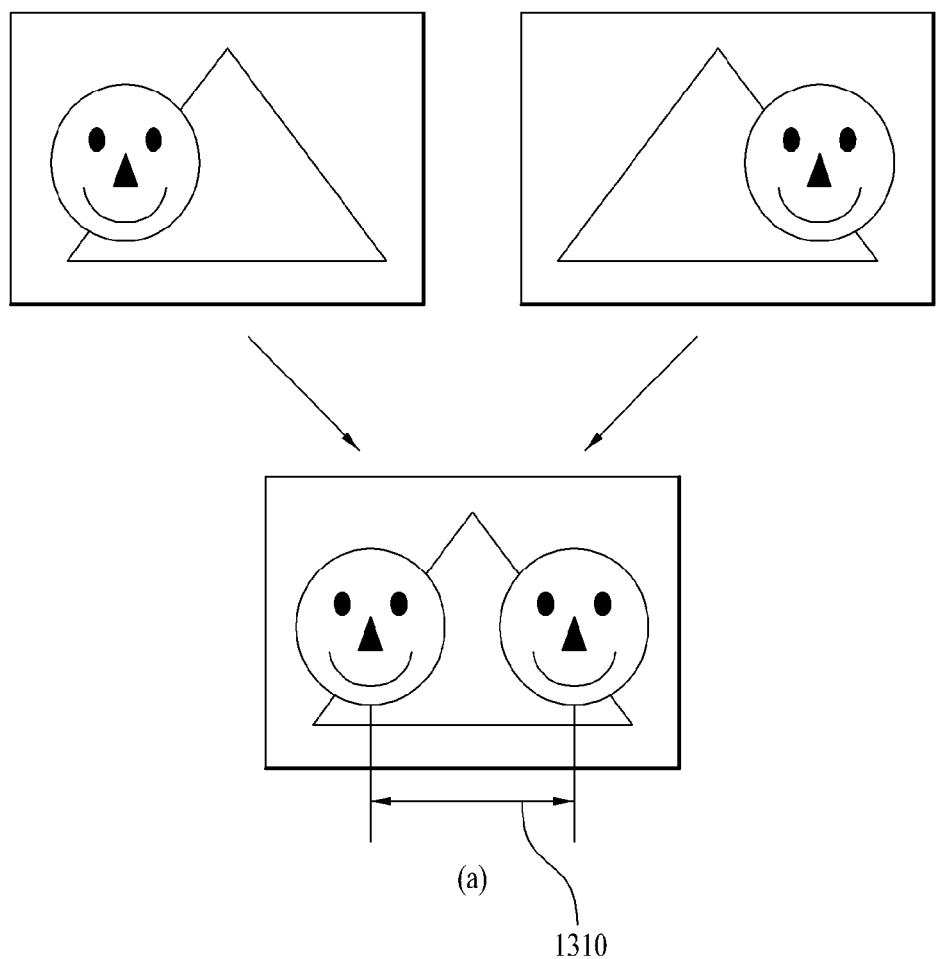
(a)
1310
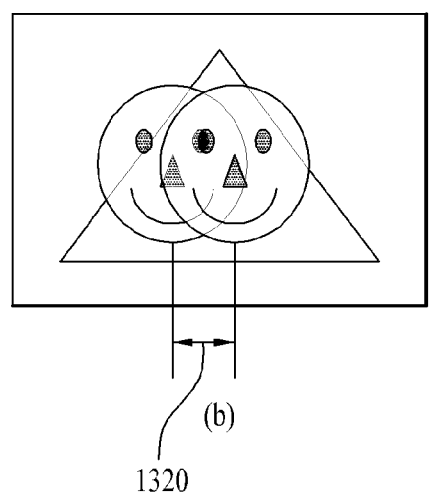
(b)
1320

FIG. 14
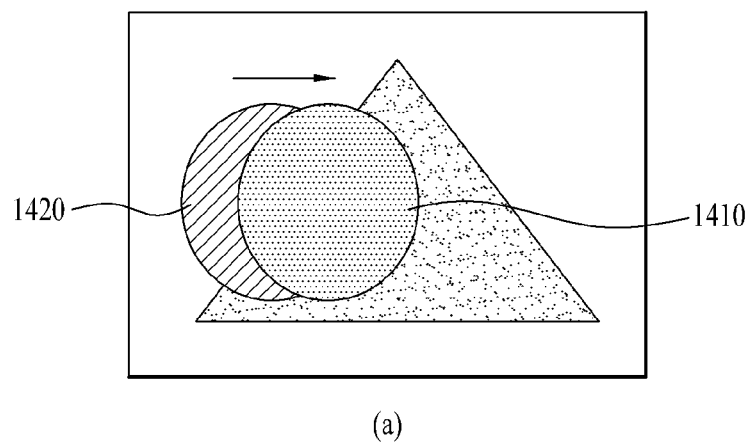
(a)
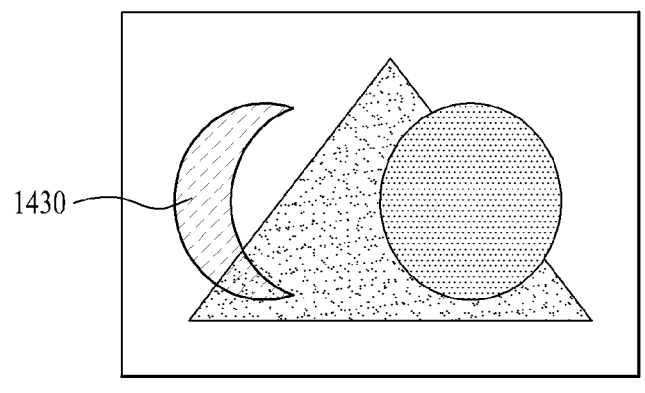
(b)

FIG. 15
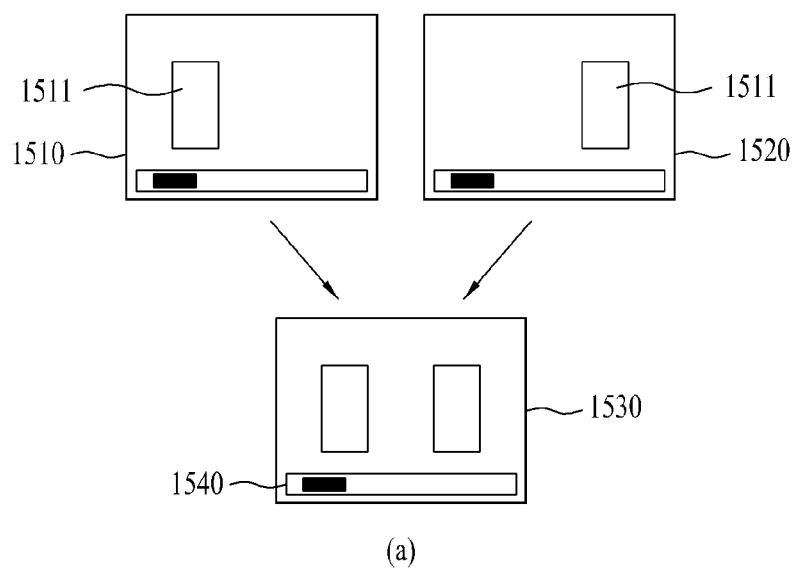
(a)
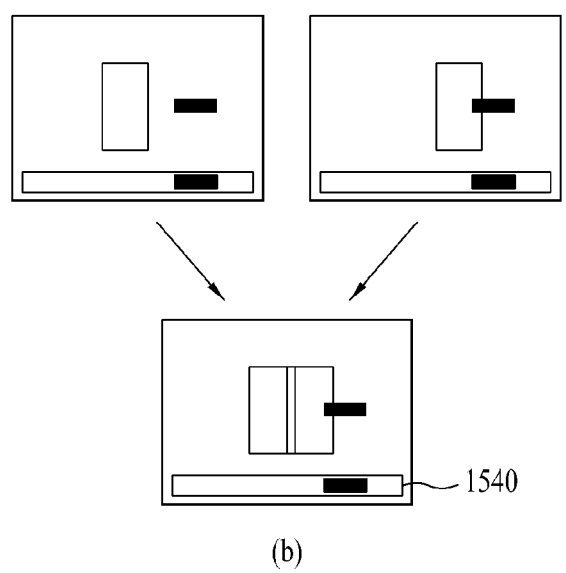
(b)

FIG. 16
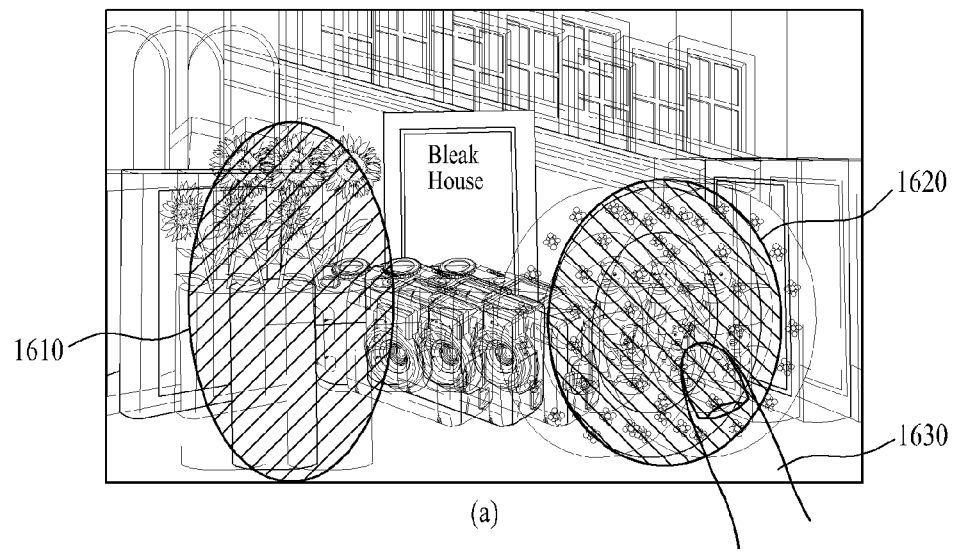
(a)
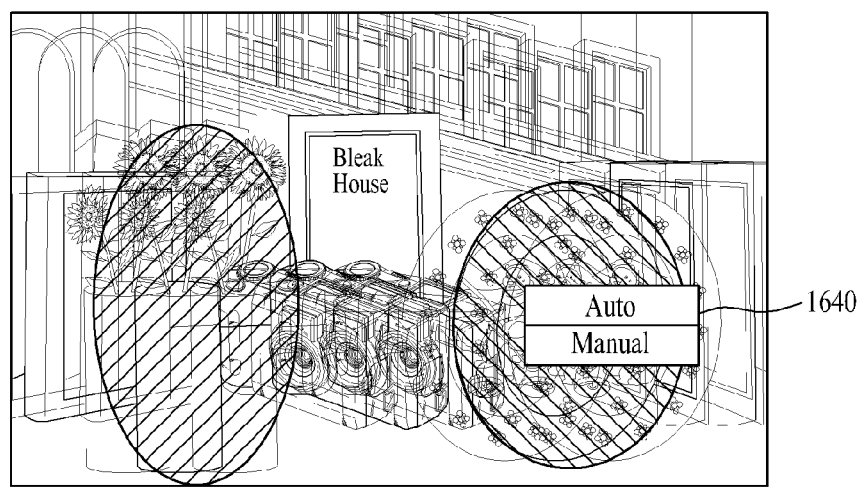
(b)
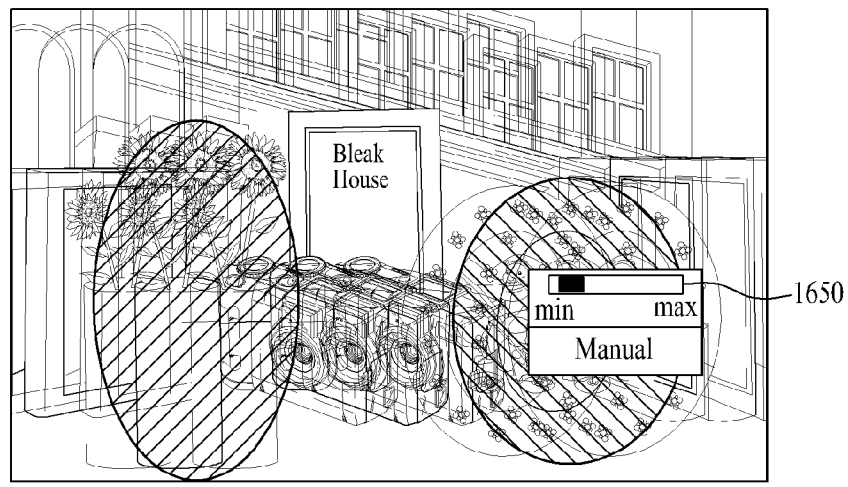
(c)

FIG. 17

| 3D parallax setting | | |
|---|---|---|
| Auto correction | (On) | Off |
| Auto correction distance | 65 | mm |
| Total collective correction | On | (Off) |
| Manual correction step | 2 | mm |
| Convergence point display | On | (Off) |

MOBILE TERMINAL AND METHOD FOR ADJUSTING AND DISPLAYING A STEREOSCOPIC IMAGE

CROSS-REFERENCE TO RELATED APPLICATIONS

Pursuant to 35 U.S.C. §119(a), this application claims the benefit of earlier filing date and right of priority to Korean Application No. 10-2010-0067815, filed on Jul. 14, 2010, the contents of which are hereby incorporated by reference herein in its entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for securing visual comfort of a user when viewing a stereoscopic image.

2. Discussion of the Related Art

Generally, terminals may be classified as mobile/portable terminals or stationary terminals. The mobile terminals may be further classified as handheld terminals or vehicle mounted terminals according to their portability.

As terminal functions are diversified, the terminal may be implemented as a multimedia player performing various functions such as photography or videography, playback of music or video, game play, broadcast reception and the like, for example.

Ongoing efforts exist to support and increase the functionality of the terminal. Such efforts include software and hardware improvements, as well as changes and improvements to the structural components which form the terminal.

Recently, terminals have developed such that a three-dimensional (3D) image can be displayed on a display unit of a terminal. However, when a 3D stereoscopic image is displayed, a terminal user may experience visual discomfort, such as dizziness and the like, caused by the displayed image. Therefore, what is needed is a 3D image correcting/displaying method for relieving the visual discomfort experienced by the user.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a user can be provided with a more convenient stereoscopic image appreciating environment.

Another object of the present invention is to provide a mobile terminal and controlling method thereof, by which a 3D depth of a specific object in a stereoscopic image can be adjusted not to cause visual inconvenience to a user.

It is to be understood that technical problems to be solved by the present invention are not limited to the aforementioned technical problems and other technical problems which are not mentioned will be apparent from the following description to the person with an ordinary skill in the art to which the present invention pertains.

To achieve these objects and other advantages and in accordance with the purpose of the invention, as embodied and broadly described herein, a mobile terminal comprises a controller and a display unit controlled by the controller and configured to display a stereoscopic image, the stereoscopic image comprising a first image provided to a left eye of a user and a second image provided to a right eye of the user. The controller detects at least one same object between the first and second images and determines a distance between a point at which the detected at least one same object is positioned in the first image and a point at which the detected at least one same object is positioned in the second image. When the determined distance is equal to or greater than a preset critical value, the controller changes a position of the at least one same object in each of the first and second images to decrease the distance between the point at which the at least one same object is positioned in the first image and the point at which the at least one same object is positioned in the second image to less than the preset critical value, and the controller displays the changed first and second images on the display unit.

In one aspect of the invention, the display unit comprises an image displaying means and a parallax generating means provided over the image displaying means to change at least one of a propagation direction and a vibration direction of a light generated from the image displaying means. In another aspect, the controller detects the at least one same object between the first and second images by a block search algorithm or an object tracking algorithm. In a further aspect, the controller changes the position of the at least one same object in each of the first image and second image by moving the at least one same object closer to a center point between the point at which the at least one same object is positioned in the first image and the point at which the at least one same object is positioned in the second image by the same distance.

In one aspect of the invention, the controller displays the at least one same object with a prescribed visual effect before changing the position of the at least one same object. The mobile terminal may further comprise a user input unit configured to receive a user command, wherein if the at least one same object with the prescribed visual effect is selected by the user command, the controller only changes a position of the selected object in each of the first image and second image. In a further aspect, each time the selection is made, the controller changes the position of the selected object by a predetermined distance.

The mobile terminal may further comprise a user input unit configured to receive a user command, wherein if the at least one same object with the prescribed visual effect is selected by the user command, the controller displays a menu window in the vicinity of the selected object to enable the user to select a manual execution of the position change or an automatic execution of the position change of the selected object. In one aspect, if the manual execution is selected from the menu window, the controller displays a scroll bar for adjusting a distance of the position change of the selected object. In another aspect, if the automatic execution is selected from the menu window, the controller changes the position of the selected object in each of the first image and second image such that the distance between the point at which the selected object is positioned in the first image and the point at which the selected object is positioned in the second image is less than the preset critical value.

The controller may display a convergence object positioned at a same position in the first and second images with a different prescribed visual effect according to a relative level of a stereoscopic effect of the at least same object.

In one aspect of the invention, the first image and the second image correspond to one video frame, wherein when the position of the at least one same object is changed in each of the first image and second image, if a lost space is generated in the one video frame, the controller controls an image corresponding to the lost space to be inserted in a video frame next to or previous to the one video frame.

In a further aspect of the invention, when the position of the at least one same object is changed in one of the first image and second image, if a lost space is generated, the controller controls an image corresponding to the lost space in the other of the first image and second image to be inserted in the lost space in the one of the first image and second image.

In another aspect of the invention, the preset critical value is a distance corresponding to a binocular interval of the user. The present invention may also be embodied as a method of controlling a mobile terminal, the method comprising detecting at least one same object between a first image and a second image displayed on a display unit, wherein the first image and second image together form a stereoscopic image, calculating a distance between a point at which the detected at least one same object is positioned in the first image and a point at which the detected at least one same object is positioned in the second image, and determining whether the calculated distance is equal to greater than a preset critical value. When the calculated distance is equal to or greater than the preset critical value, changing a position of the at least one same object in each of the first and second images to decrease the distance between the point at which the detected at least one same object is positioned in the first image and the point at which the detected at least one same object is positioned in the second image to less than the preset critical value, and displaying the changed first and second images on the display unit.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 6 illustrates a method for displaying a 3D stereoscopic image on a parallax barrier type display unit according to embodiments of the present invention.

FIG. 7 is a diagram for describing stereoscopy of a planar object.

FIG. 9 illustrates a block search algorithm according to one embodiment of the present invention.

FIG. 11 illustrates display configurations for searching left and right eye images for the same object in a mobile terminal according to one embodiment of the present invention.

FIG. 12 illustrates a method of performing position correction according to one embodiment of the present invention.

FIG. 13 illustrates a method of performing position correction according to one embodiment of the present invention.

FIG. 14 illustrates a method of compensating an image according to one embodiment of the present invention.

FIG. 15 illustrates a method of measuring and setting a critical distance according to embodiments of the present invention.

FIG. 16 illustrates a method of correcting a stereoscopic image according to one embodiment of the present invention.

FIG. 17 illustrates a menu screen for setting a method of correcting a stereoscopic image according to embodiments of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the terms 'module', 'unit' and 'part' are used for elements in order to facilitate the disclosure only. Therefore, significant meanings or roles are not given to the terms themselves and it is understood that 'module', 'unit' and 'part' can be used together or interchangeably.

The present invention can be applicable to various types of terminals. Examples of such terminals include mobile as well as stationary terminals, such as mobile phones, user equipments (UEs), smart phones, digital televisions (DTVs), computers, digital broadcast terminals, personal digital assistants (PDAs), portable multimedia players (PMPs) and navigators.

By way of non-limiting example only, further description will be with regard to a mobile terminal 100. However, it should be noted that such teachings may apply equally to other types of terminals.

Figure 1:
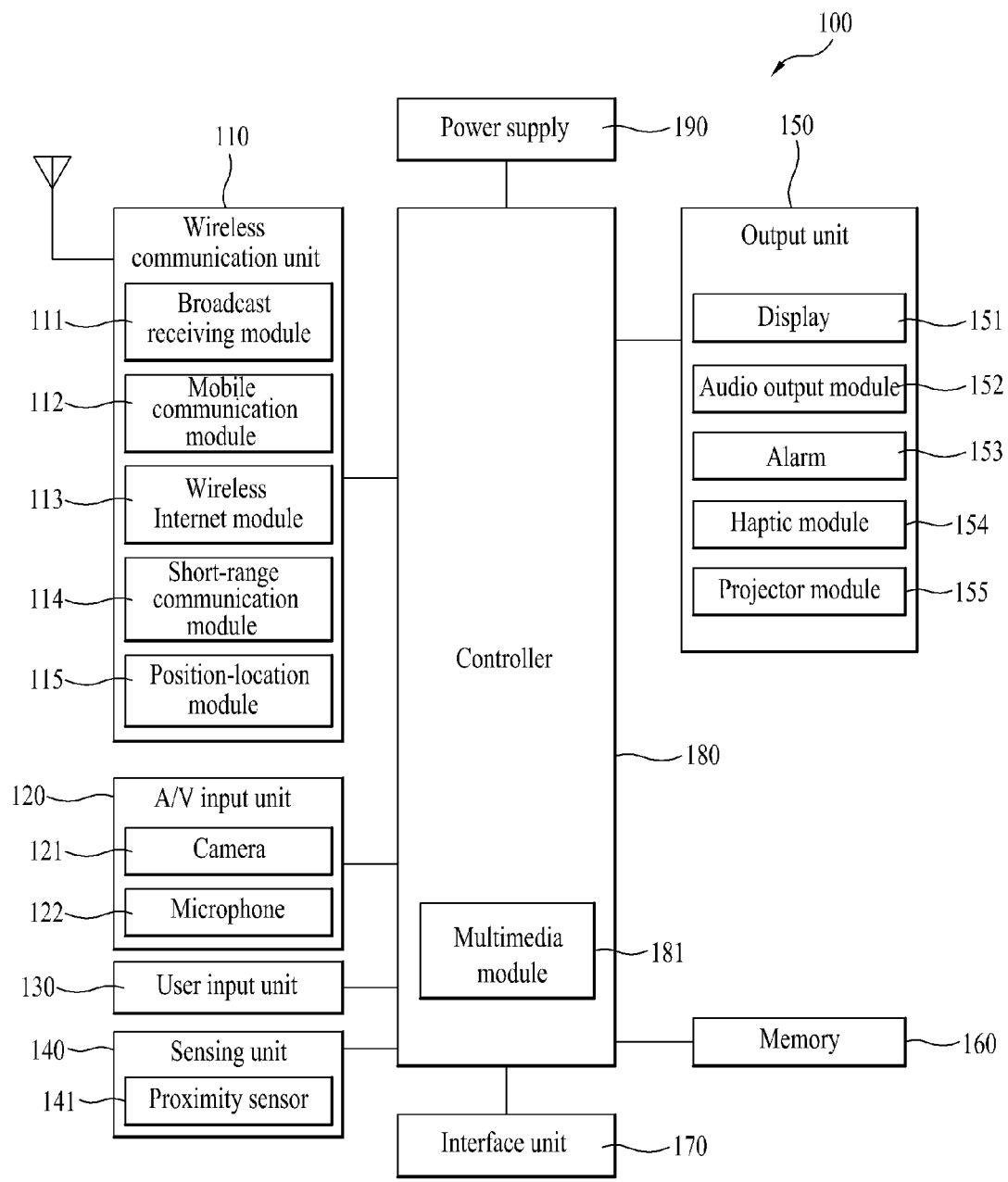
FIG. 1 is a block diagram of a mobile terminal according to one embodiment of the present invention.

FIG. 1 is a block diagram of a mobile terminal 100 in accordance with an embodiment of the present invention. FIG. 1 shows that the mobile terminal 100 according to one embodiment of the present invention includes a wireless communication unit 110, an audio/video (A/V) input unit 120, a user input unit 130, a sensing unit 140, an output unit 150, a memory 160, an interface unit 170, a controller 180, a power supply 190, and the like. FIG. 1 shows the mobile terminal 100 having various components, but it is understood that implementing all of the illustrated components is not a requirement. Greater or fewer components may alternatively be implemented.

The wireless communication unit 110 may include one or more components facilitating wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel.

The broadcast managing server may include a server which generates and transmits a broadcast signal and/or broadcast associated information, or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information may include information associated with a broadcast channel, a broadcast program, a broadcast service provider, etc. And, the broadcast associated information can be provided via a mobile communication network. In one embodiment, the broadcast associated information can be received by the mobile communication module 112.

The broadcast associated information can be implemented in various forms. For example, the broadcast associated information may include an electronic program guide (EPG) of a digital multimedia broadcasting (DMB) system or an electronic service guide (ESG) of a digital video broadcast-handheld (DVB-H) system.

The broadcast receiving module 111 may be configured to receive broadcast signals transmitted from various types of broadcast systems. By nonlimiting example, such broadcasting systems include a digital multimedia broadcasting-terrestrial (DMB-T) system, a digital multimedia broadcasting-satellite (DMB-S) system, a digital video broadcast-handheld (DVB-H) system, the data broadcasting system known as media forward link only (MediaFLO®) and an integrated services digital broadcast-terrestrial (ISDB-T) system. The broadcast receiving module 111 may also be configured for other broadcasting systems in addition to the digital broadcasting systems mentioned above. The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transmissions/receptions, among others.

The wireless Internet module 113 supports Internet access for the mobile terminal 100. The wireless Internet module 113 module may be internally or externally coupled to the mobile terminal 100. In one embodiment, a wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing the short-range communication module 114 include radio frequency identification (RFID), infra-red data association (IrDA), ultra-wideband (UWB), as well at the networking technologies commonly referred to as Bluetooth® and ZigBee®, to name a few.

The position-location module 115 identifies or obtains the location of the mobile terminal 100. If desired, the position-location module 115 may be implemented with a global positioning system (GPS) module.

Referring to FIG. 1, the audio/video (A/V) input unit 120 is configured to provide an audio or video signal input to the mobile terminal 100. As shown, the A/V input unit 120 includes a camera 121 and a microphone 122. The camera 121 receives and processes image frames of still pictures or video obtained by an image sensor in a video call mode or a photographing mode. The processed image frames can be displayed on the display 151.

The image frames processed by the camera 121 can be stored in the memory 160 or can be externally transmitted via the wireless communication unit 110. Optionally, at least two cameras 121 can be provided on the mobile terminal 100 according to implementation.

The microphone 122 receives an external audio signal while the mobile terminal is in a particular mode, such as phone call mode, recording mode or voice recognition. The audio signal is processed and converted into electric audio data. The processed audio data is then transformed into a format transmittable to a mobile communication base station via the mobile communication module 112 in case of a call mode. The microphone 122 includes assorted noise removing algorithms to remove noise generated in the course of receiving the external audio signal.

The user input unit 130 generates input data responsive to user manipulation of an associated input device or devices. Examples of such input devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For example, the sensing unit 140 may detect an open/closed status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation of the mobile terminal 100 or acceleration/deceleration of the mobile terminal 100.

In one embodiment, the mobile terminal 100 may be configured as a slide-type mobile terminal. In this configuration, the sensing unit 140 may sense whether a sliding portion of the mobile terminal is open or closed. Other examples include the sensing unit 140 sensing the presence or absence of power provided by the power supply 190 or the presence or absence of a coupling or other connection between the interface unit 170 and an external device. The sensing unit 140 can include a proximity sensor 141.

The output unit 150 generates outputs relevant to a user's senses of sight, hearing, touch and the like. The output unit 150 includes the display 151, an audio output module 152, an alarm unit 153, a haptic module 154, a projector module 155 and the like.

The display 151 may visually display (output) information associated with the mobile terminal 100. For example, if the mobile terminal is operating in a phone call mode, the display may provide a user interface (UI) or graphical user interface (GUI) which includes information associated with placing, conducting, and terminating a phone call. In another example, if the mobile terminal 100 is in a video call mode or a photographing mode, the display 151 may additionally or alternatively display images associated with the video call mode or photographing mode on the UI or GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented as a transparent or optically transmissive type, hereinafter called a transparent display. A representative example of the transparent display is a transparent OLED (TOLED) or the like. A rear configuration of the display 151 may be implemented as an optically transmissive type as well. In this configuration, a user is able to see an object behind a terminal body via the area occupied by the display 151 of the terminal body.

At least two displays 151 may be provided on the mobile terminal 100 in accordance with one embodiment. For example, a plurality of displays may be arranged on a single face of the mobile terminal 100, either spaced apart from each other or built as a single body. Alternatively, the plurality of displays can be arranged on different faces of the mobile terminal 100.

In one embodiment, if the display 151 and a sensor for detecting a touch action (hereinafter called a 'touch sensor') configures a mutual layer structure (hereinafter called a 'touchscreen'), a user may use the display 151 as an input device as well as an output device. The touch sensor may be a touch film, a touch sheet, a touchpad or the like.

The touch sensor can convert a pressure applied to a specific portion of the display 151, or a variation of capacitance generated from a specific portion of the display 151, into an electric input signal. Moreover, the touch sensor may detect a touch pressure as well as a touch position or size.

If a touch input is made to the touch sensor, a signal corresponding to the touch input is transferred to a touch controller. The touch controller processes the signal and then transfers the processed signal to the controller 180. Therefore, the controller 180 is able to know whether a prescribed portion of the display 151 is touched.

Referring to FIG. 1, a proximity sensor 141 may be provided to an internal area of the mobile terminal 100 enclosed by the touchscreen or around the touchscreen. The proximity sensor 141 detects a presence or non-presence of an object approaching a prescribed detecting surface, or an object existing around the proximity sensor, by detecting an electromagnetic field strength or infrared ray without mechanical contact. Hence, the proximity sensor 141 may be more durable and have wider utility than a contact type sensor.

The proximity sensor 141 may be a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. If the touchscreen includes the electrostatic capacity proximity sensor, the touchscreen detects the proximity of a pointer using a variation of electric field according to the proximity of the pointer. In this case, the touchscreen (touch sensor) may be classified as a proximity sensor.

In the following description, for clarity, the action of a pointer approaching, without contacting, the touchscreen and recognized as located on the touchscreen is referred to as a 'proximity touch'. And, the action of a pointer actually contacting the touchscreen is referred to as a 'contact touch'. Furthermore, a position on the touchscreen "proximity-touched" by the pointer refers to a position of the pointer that vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state, etc.). Information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data received from the wireless communication unit 110 or stored in the memory 160. During operation, the audio output module 152 outputs audio related to a particular function (e.g., call received, message received, etc.). The audio output module 152 may be implemented using one or more speakers, buzzers, other audio producing devices, and combinations thereof.

The alarm unit 153 outputs a signal for announcing the occurrence of a particular event associated with the mobile terminal 100. Events may include a call received event, a message received event and a touch input received event, for example. The alarm unit 153 may output a signal for announcing the event occurrence by way of vibration as well as video or audio signal. The video or audio signal can be outputted via the display 151 or the audio output unit 152. Hence, the display 151 or the audio output module 152 may be considered part of the alarm unit 153.

The haptic module 154 generates various tactile effects that can be sensed by a user. Vibration is an example of one of the tactile effects generated by the haptic module 154. Strength and pattern of the vibration generated by the haptic module 154 may be controllable. For example, different vibrations can be outputted by being synthesized together or outputted in sequence.

The haptic module 154 may generate tactile effects in addition to vibration. For example, the haptic module 154 may generate the effect attributed to an arrangement of pins vertically moving against a contacted skin surface, the effect attributed to an injection/suction power of air though an injection/suction hole, the effect attributed to a skim over a skin surface, the effect attributed to an electrode contact, the effect attributed to an electrostatic force, the effect attributed to a representation of a hot/cold sense using an endothermic or exothermic device and the like.

The haptic module 154 enables a user to sense the tactile effect through a muscle sense of a finger, arm or the like, as well as to transfer the tactile effect through direct contact. Optionally, at least two haptic modules 154 can be provided on the mobile terminal 100 in accordance with one embodiment of the present invention.

The projector module 155 performs an image projector function using the mobile terminal 100. The projector module 155 is able to display an image, which is identical to or partially different from an image displayed on the display 151, on an external screen or wall according to a control signal of the controller 180.

In one embodiment, the projector module 155 may include a light source generating light (e.g., laser) for projecting an image externally, an image producing means for producing an image to output externally using the light generated from the light source, and a lens for enlarging the image to output externally at a predetermined focal distance. The projector module 155 can further include a device for adjusting a direction the image is projected by mechanically moving the lens or the entire module.

The projector module 155 may be a cathode ray tube (CRT) module, a liquid crystal display (LCD) module, a digital light processing (DLP) module or the like according to a device type of a display means. In one embodiment, the DLP module is operated by enabling light generated from a light source to reflect on a digital micro-mirror device (DMD) chip, which is advantageous for downsizing the projector module 155.

In one embodiment, the projector module 155 may be provided in a length direction of a lateral, front or backside direction of the mobile terminal 100. However, it is understood that the projector module 155 may be provided to any portion of the mobile terminal 100 according to necessity.

The memory unit 160 may store various types of data to support the processing, control, and storage requirements of the mobile terminal 100. Examples of such data include program instructions for applications operating on the mobile terminal 100, contact data, phonebook data, message data, audio data, still picture data, moving picture data, etc. And, a recent use history or a cumulative use frequency of each data (e.g., use frequency of each phonebook data, each message data or each multimedia data) can be stored in the memory unit 160. Moreover, data for various patterns of vibration and/or sound outputted in case of a touch input to the touchscreen may be stored in the memory unit 160.

The memory unit 160 may be implemented using any type or combination of suitable volatile and non-volatile memory or storage devices including a hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. Furthermore, the mobile terminal 100 may operate in association with a web storage for performing a storage function of the memory 160 on the Internet.

The interface unit 170 couples the mobile terminal 100 with external devices. The interface unit 170 receives data from the external devices, or is supplied with power, and transfers the data or power to respective elements of the mobile terminal 100, or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is a chip for storing various types of information for authenticating a use authority of the mobile terminal 100, and may include a User Identity Module (UIM), a Subscriber Identity Module (SIM), a Universal Subscriber Identity Module (USIM) and/or the like. A device having the identity module (hereinafter called 'identity device') can be manufactured as a smart card. Therefore, the identity device is connectable to the mobile terminal 100 via a corresponding port.

When the mobile terminal 110 is connected to an external cradle, the interface unit 170 becomes a passage for supplying the mobile terminal 100 with power from the cradle or a passage for delivering various command signals input from the cradle by a user to the mobile terminal 100. Each of the various command signals input from the cradle, or the power, may operate as a signal enabling the mobile terminal 100 to recognize that it is correctly loaded in the cradle.

The controller 180 controls the overall operations of the mobile terminal 100. For example, the controller 180 performs control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input or a picture drawing input carried out on the touchscreen as characters or images, respectively.

The power supply 190 provides power required by the various components of the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
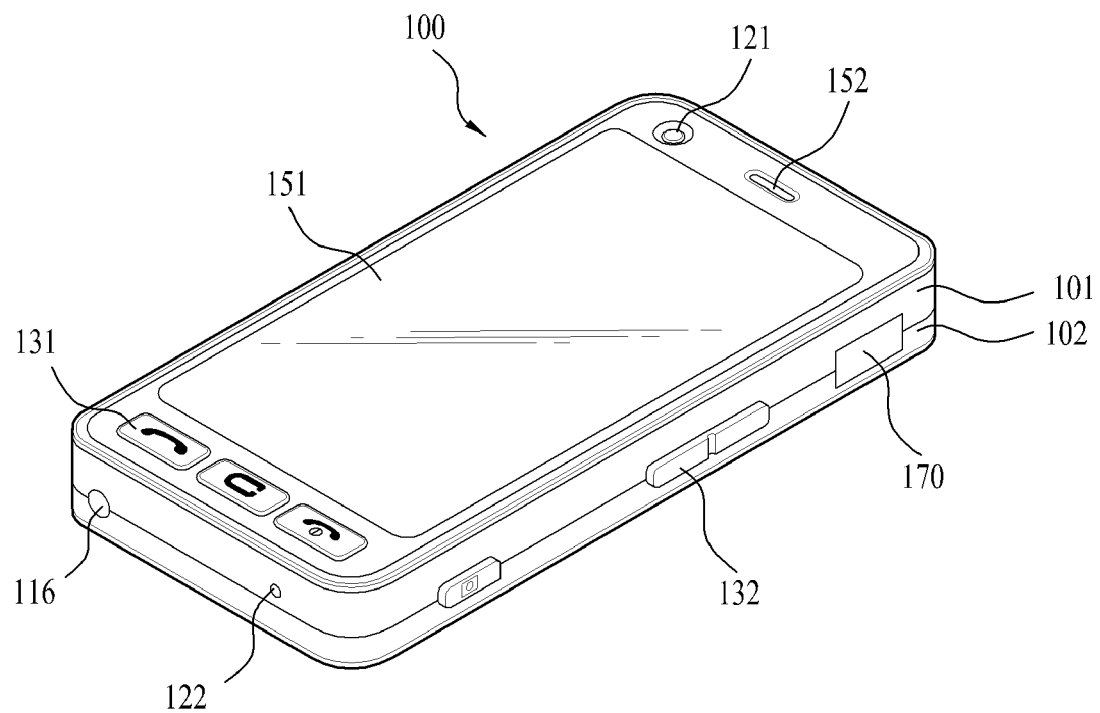
FIG. 2 is a front perspective view of a mobile terminal according to one embodiment of the present invention.

FIG. 2 is a front perspective diagram of a mobile terminal according to one embodiment of the present invention. The mobile terminal 100 shown in the figure has a bar type terminal body. However, the mobile terminal 100 may be implemented in a variety of different configurations. Examples of such configurations include a folder-type, slide-type, rotational-type, swing-type and combinations thereof. For clarity, further disclosure will primarily relate to a bar-type mobile terminal 100. However, such teachings apply equally to other types of mobile terminals.

Referring to FIG. 2, the mobile terminal 100 includes a case (casing, housing, cover, etc.) configuring an exterior thereof. In one embodiment, the case may be divided into a front case 101 and a rear case 102. Various electric/electronic parts are loaded in a space provided between the front and rear cases 101 and 102. Optionally, at least one middle case can be further provided between the front and rear cases 101 and 102.

The cases 101 and 102 are formed by injection molding of synthetic resin, or may be formed of a metal substance such as stainless steel (STS), titanium (Ti) or the like, for example.

A display 151, an audio output unit 152, a camera 121, user input units 131 and 132, a microphone 122, an interface 180 and the like can be provided on the terminal body, and more particularly, to the front case 101.

The display 151 occupies most of a main surface of the front case 101. The audio output unit 152 and the camera 121 are provided on an area adjacent to an end portion of the display 151, while the user input unit 131 and the microphone 122 are provided on an area adjacent to another end portion of the display 151. The user input unit 132 and the interface 170 can be provided to lateral sides of the front and rear cases 101 and 102.

The input unit 130 of FIG. 1 may include the input units 131 and 132 of FIG. 2, which are manipulated to receive a command for controlling an operation of the terminal 100. The input units 131 and 132 may be referred to as a manipulating portion and may adopt any mechanism of a tactile manner that enables a user to perform a manipulating action while experiencing a tactile feeling.

Content input via the first or second input units 131 or 132 can be diversely set. For example, commands such as a start command, end command, scroll command and the like may be input via the first input unit 131. Meanwhile, commands such as a command for adjusting a volume of sound output from the audio output unit 152, a command for switching to a touch-recognition mode of the display 151, or the like, can be input via the second input unit 132.

Figure 3:
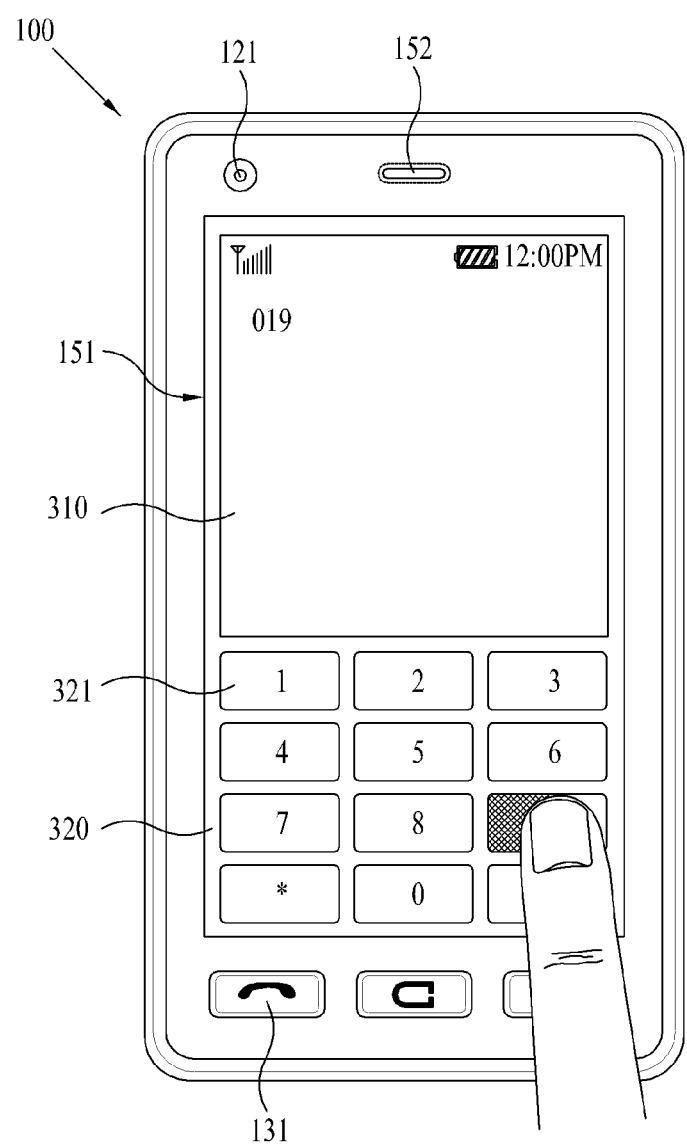
FIG. 3 is a front view of a mobile terminal according to one embodiment of the present invention.

FIG. 3 is a front view of a terminal according to one embodiment of the present invention. Various types of visual information may be displayed on the display 151. The various types of information can be displayed as characters, numerals, symbols, graphics, icons and the like.

In order to input the information, at least one of the characters, numerals, symbols, graphics or icons are represented as a single predetermined array implemented in a keypad formation on the display 151. The keypad formation may be referred to as "soft keys."

FIG. 3 shows that a touch applied to a soft key is input through a front face of a terminal body. The display 151 is operable through an entire area of the display or a plurality of divided regions of the display. In the latter case, the plurality of divided regions may be interoperable with each other.

For example, an output window 310 and an input window 320 are displayed on the display 151. A soft key 321 representing a digit for inputting a phone number or the like is displayed in the input window 320. If the soft key 321 is touched, a digit corresponding to the touched soft key is displayed in the output window 310. If the first input unit 131 is manipulated, a call connection for the phone number displayed in the output window 310 is attempted.

Additionally, the display 151 may be configured to receive a touch input by scroll. A user scrolls the display 151 to shift a cursor or pointer located at an entity (e.g., icon or the like) displayed on the display 151. When a finger is shifted on the display 151, a path of the shifted finger may be visually displayed on the display 151. This may be useful in editing an image displayed on the display 151.

For clarity and convenience, the mobile terminal described in the following description includes at least one of the components shown in FIG. 1. Moreover, a graphic for pointing at a specific object on a display unit or selecting a menu from the display unit, such as an arrow, a finger and the like, is referred to as a pointer or cursor. Yet, the term "pointer" is frequently used to indicate a finger, stylus pen or the like, for performing a touch manipulation and the like. In order to clearly discriminate the pointer and the cursor from each other in the disclosure, a graphic displayed on a display unit is referred to as a cursor. Meanwhile, a physical means for performing a touch, proximity touch, gesture and the like, such as a finger, stylus pen and the like is referred to as a pointer.

In the following description, types of three-dimensional (3D) stereoscopic images and implementing methods thereof will be described. Specifically, a method of displaying a 3D image in a mobile terminal applicable to embodiments of the present invention and a display unit configuration for the same will be explained.

Stereoscopic images implemented on the display unit 151 of the mobile terminal 100 according to the present invention may be classified into two categories. Here, the reference for this classification is attributed to whether different images are provided to both eyes of a user, respectively.

First and second stereoscopic image categories are described as follows. The first category is a monoscopic scheme of providing the same image to both eyes and is advantageous in that it can be implemented with a general display unit 151. In particular, the controller 180 arranges a polyhedron generated from combining at least one of dots, lines, surfaces or a combination thereof in a virtual 3D space and enables an image, which is generated from seeing the polyhedron in a specific view, to be displayed on the display unit 151. Therefore, such a stereoscopic image can substantially include a planar image.

The second category is a stereoscopic scheme of providing a different image to both eyes, respectively, which uses the principle that a user can sense a stereoscopic effect when looking at an object with his/her own eyes. In particular, the user's eyes are configured to see different planar images when looking at the same object due to a distance between the eyes. These different images are forwarded to the user's brain via retinas. The user's brain is able to sense depth and reality of a 3D image by combining the different images together. Therefore, binocular disparity attributed to the distance between the eyes enables the user to sense the stereoscopic effect despite the existence of an individual difference of the binocular disparity more or less. Therefore, the binocular disparity is an important factor of the second category. The binocular disparity is explained in detail with reference to FIG. 4 as follows.

Figure 4:
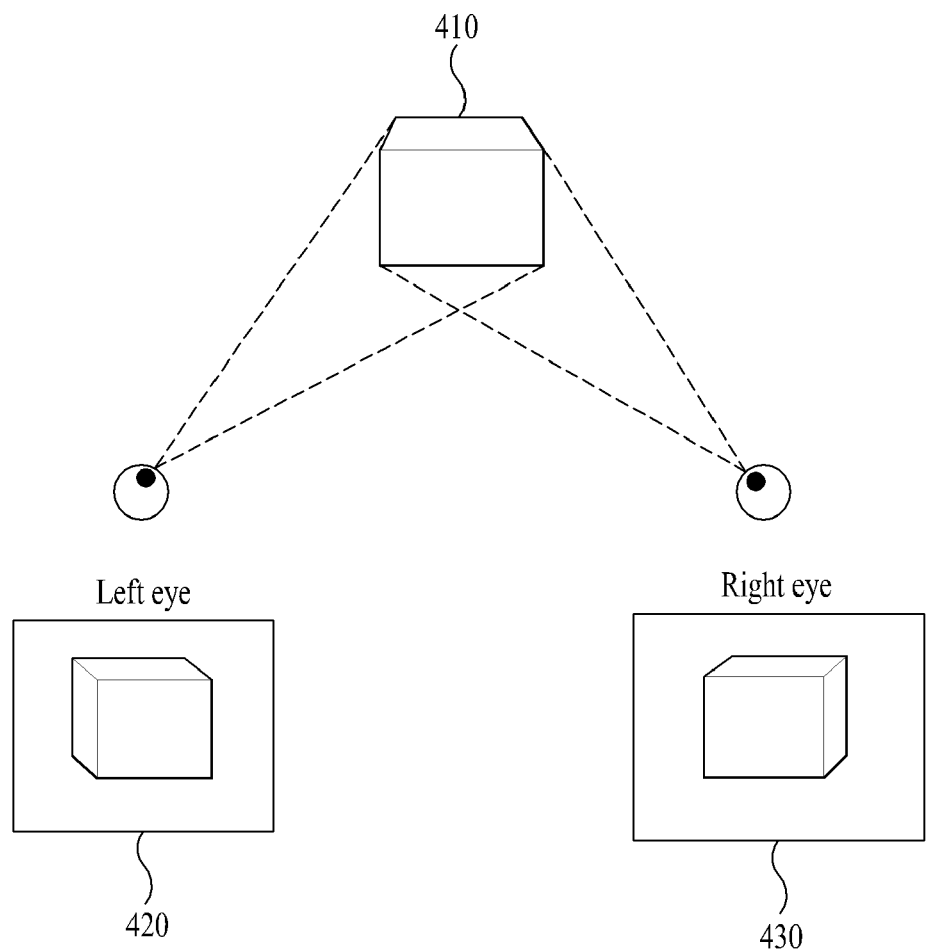
FIG. 4 is a diagram illustrating the principle of binocular disparity.

FIG. 4 is a diagram for explaining the principle of binocular disparity. Referring to FIG. 4, a hexahedron 410 is positioned as an object in front of a user's eyes below the user's eye level. Here, the user's left eye is able to see a left eye planar image 420 revealing three facets including a top side, a front side and a left lateral side of the hexahedron 410 only. The user's right eye is able to see a right eye planar image 430 revealing three facets including the top side, the front side and a right lateral side of the hexahedron 410 only. Accordingly, even if an actual object is not positioned in front of the user's eyes, so long as the left eye planar image 420 and the right eye planar image 430 arrive at the user's left eye and right eye, respectively, the user can substantially sense the hexahedron 410 as if looking at an actual object.

In order to implement the 3D image belonging to the second category in the mobile terminal 100, images of the same object should arrive at both of the user's eyes such that the images are discriminated from each other for the left and right eye with a predetermined parallax. In the following description, 3D depth attributed to binocular disparity is explained with reference to FIG. 5.

Figure 5:
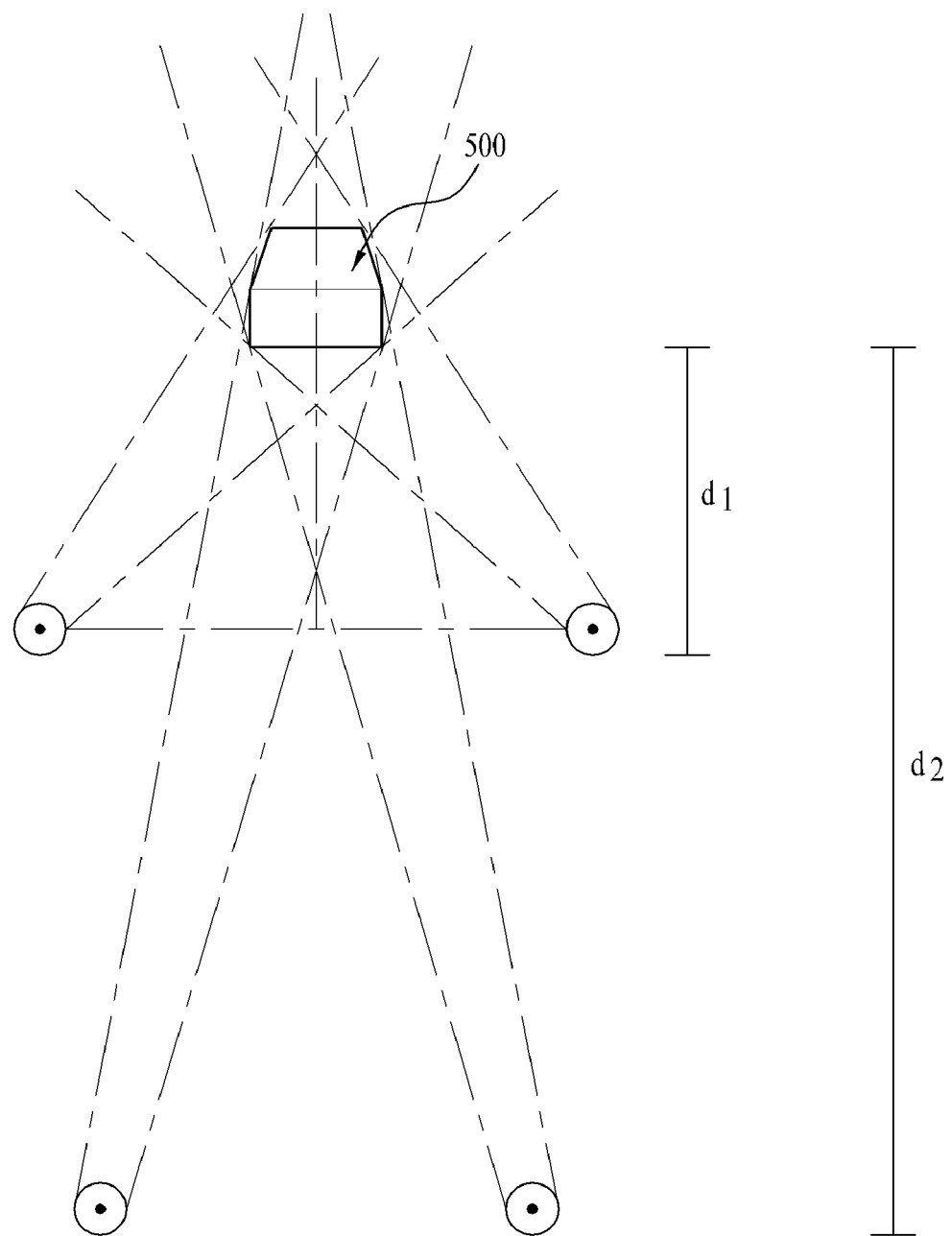
FIG. 5 is a diagram illustrating a sense of distance and 3D depth attributed to binocular disparity.

FIG. 5 is a diagram illustrating a sense of distance and 3D depth attributed to binocular disparity. Referring to FIG. 5, a lateral side ratio of an image entering each eye viewing a hexahedron 500 at a distance d1 from both eyes is relatively higher than that at a distance d2, whereby a difference between images seen through both eyes increases. Moreover, an extent of a stereoscopic effect sensed by a user viewing the hexahedron 500 at the distance d1 may become higher than that viewing the hexahedron 500 at the distance d2. In particular, when an object is seen through both eyes of the user, a closer object provides a greater stereoscopic effect, whereas a farther object provides a smaller stereoscopic effect.

A difference in stereoscopic effect can be digitized into a 3D depth or a 3D level. In the following description, a high stereoscopic effect of an object situated closer shall be represented as a low 3D depth and a low 3D level. And, a low stereoscopic effect of an object situated farther shall be represented as a high 3D depth and a high 3D level. As the definition of the 3D depth or level is relatively set, a classification reference for the 3D depth or level and an increasing/decreasing direction of the 3D depth or level is changeable.

For clarity, in order to discriminate the above-mentioned two categories from each other, a stereoscopic image belonging to the first category will be referred to as a "2D stereoscopic image" and a stereoscopic image belonging to the second category will be referred to as a "3D stereoscopic image."

A method of implementing a 3D stereoscopic image is described as follows. As mentioned in the following description, in order to implement a 3D stereoscopic image, an image for a right eye and an image for a left eye are to arrive at both eyes in a manner of being discriminated from each other. For this, various methods are explained as follows.

In one embodiment, a parallax barrier scheme enables different images to arrive at the user's eyes by controlling a propagating direction of light by electronically driving a cut-off device provided between a general display and the user's eyes. This is explained with reference to FIG. 6 as follows.

FIG. 6 illustrates a scheme of implementing a 3D stereoscopic image in a parallax barrier type display unit according to embodiments of the present invention. Referring to FIG. 6, a structure of a parallax barrier type display unit 151 for displaying a 3D image comprises a general display device 151a combined with a switch LC (liquid crystals) 151b. A propagating direction of light is controlled by activating an optical parallax barrier 600, as shown in FIG. 6(*a*), using the switch LC 151b, whereby the light is separated into two different lights to arrive at the user's left and right eyes, respectively. Thus, when an image generated from combining an image for the right eye and an image for the left eye together is displayed on the display device 151a, the user's right sees a corresponding right eye image, and the user's left eye sees a corresponding left eye image, and thereby the user experiences the 3D or stereoscopic effect.

Alternatively, referring to FIG. 6(*b*), the parallax barrier 600 of the switch LC 151b is electrically controlled to enable all light to be transmitted therethrough, whereby light separation due to the parallax barrier is avoided. Therefore, the same image can be seen by the user's left and right eyes. In this case, the same function of a conventional display unit is performed.

FIG. 6 exemplarily shows that the parallax barrier performs parallel translation in one axial direction, by which the present invention is non-limited. Alternatively, the present invention a parallax barrier may be used that enables parallel translation in at least two axial directions according to a control signal from the controller 180.

In another embodiment of the invention, a lenticular scheme relates to a method of using a lenticular screen provided between a display and the user's eyes. In particular, a propagating direction of light is refracted via lens on the lenticular screen, whereby different images arrive at each of the user's eyes, respectively.

In another embodiment of the invention, according to a polarized glasses scheme, polarizing directions are set orthogonal to each other to provide different images to each of the user's eyes, respectively. In case of circular polarization, polarization is performed having a different rotational direction, whereby different images can be provided to each of the user's eyes, respectively.

In another embodiment of the invention, an active shutter scheme is similar to the polarized glasses scheme. Here, a right eye image and a left eye image are alternately displayed on a display unit with a prescribed periodicity. And, a pair of glasses worn by the user closes an opposing shutter when an image of a corresponding direction is displayed. Therefore, the image of the corresponding direction arrives at the user's eye in a corresponding direction. Specifically, while the left eye image is displayed on the display unit, a shutter for the right eye is closed to enable the left eye image to arrive at the left eye only. On the contrary, while the right eye image is displayed on the display unit, a shutter for the left eye is closed to enable the right eye image to arrive at the right eye only.

In the following description, a mobile terminal according to one embodiment of the present invention is able to provide a user with a 3D stereoscopic image via the display unit 151 by one of the above described methods. Because the 3D image principle described with reference to FIG. 5 and FIG. 6 provides for a stereoscopic object, the object of a left eye image differs from the object of a right eye image in shape. Yet, if an object is not a stereoscopic object but a planar object, a shape of the object of a left eye image is identical to a shape of the object of a right eye image. If a position of the object of the left eye image is different from that of the object of the right eye image, a user is able to view the corresponding object in the perspective. To help understand the present invention, a stereoscopic image in the following description is a planar object. However, it is apparent to those skilled in the art that the description below is applicable to a stereoscopic object as well.

FIG. 7 is a diagram for describing stereoscopy of a planar object according to an embodiment of the present invention. Referring to FIG. 7, a distance between the user's eyes 770 and a first planar object 710 is set to d. Moreover, three planar objects 720, 730 and 740 exist between the user's eyes 770 and the first planar object 710 at distances less than d from the user's eyes, respectively.

In order to provide the user with a stereoscopic or cubic effect according to an arranged formation of the planar objects shown in FIG. 7(*a*), a different 3D depth is provided to each of the planar objects according to a distance from the user's eyes. As a result, a configuration resulting from overlapping left and right eye images with each other can be represented as shown in FIG. 7(*b*). Here, the drawings representing the eye image overlapped configurations including the configuration shown in FIG. 7(*b*) are provided to help understand the difference between the images of the objects for the user's eyes. And, images actually displayed on the display unit may be different from the configurations shown in the drawings according to 3D stereoscopic image implementing schemes.

Referring to FIG. 7(*b*), a position of each of the objects 730 and 740 within the left eye and right eye images appearing closer to the user is different from a position of the object 720 appearing relatively farther from the user. The object 710, which appears no different between the left eye and right eye images, is seen at a position corresponding to a distance between the eyes 770 and the display unit 151.

For clarity, in the following description, a point having no position difference between a left eye image and a right eye image is referred to as a convergence point, and an object having no position difference between a left eye image and a right eye image is referred to as a convergence object. Therefore, the larger the difference of the object's position between the the left eye image and the right eye image, the larger a 3D depth difference from a convergence point sensed by the user.

Moreover, if an object has a larger 3D depth difference from a convergence point, a difference between the object's position within the left eye image and right eye image increases. This is explained with reference to FIG. 8 as follows.

Figure 8:
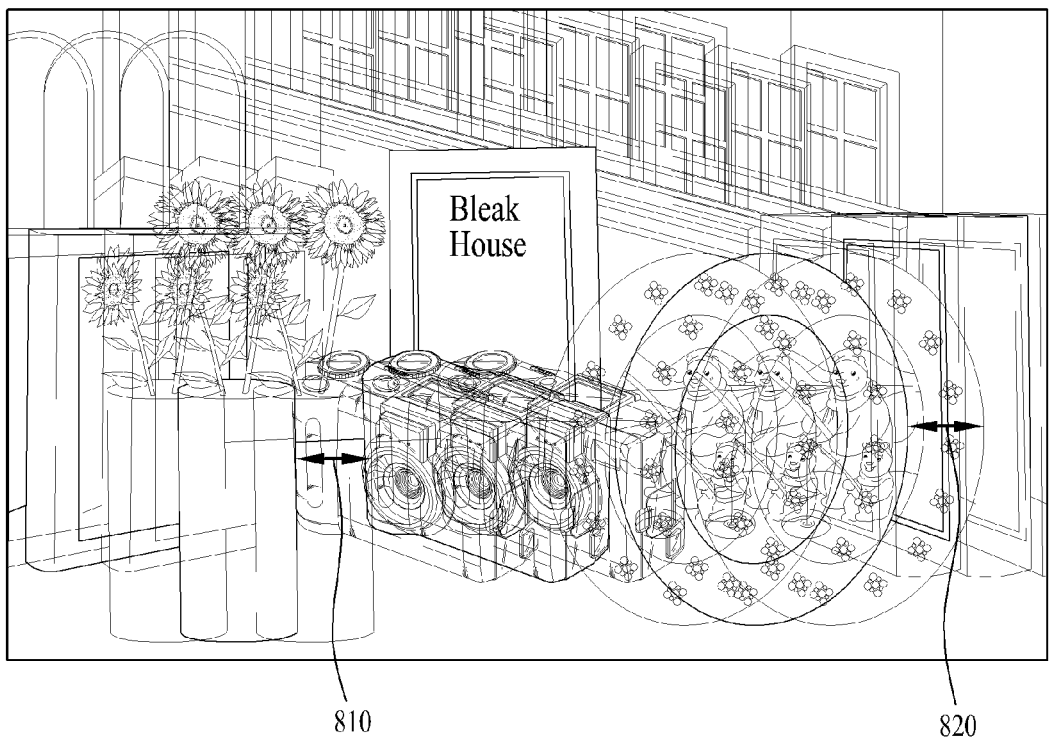
FIG. 8 illustrates a display configuration resulting from combining right and left eye images together to indicate a difference between arranged positions in the images.

FIG. 8 is a diagram of a display configuration resulting from combining right eye and left eye images together to indicate a difference between an object's position in the images according to an embodiment of the present invention. Referring to FIG. 8, a distance difference 810 between a position of a flowerpot object within a left eye image and the position of the flowerpot object within a right eye image, or a distance difference 820 between a position of a dish object in the left eye image and the position of the dish object within the right eye image, is relatively larger than that of other objects. Here, although a stereoscopic effect experienced by a user is raised, if the distance difference between the positions of a corresponding object within the respective left eye and right eye images exceeds a predetermined range, the user may experience dizziness, or other visual inconvenience. According to an embodiment, the predetermined range may be a distance of 5 cm to 7 cm, for example, corresponding to a distance between the left and right eyes of an ordinary user.

According to one embodiment of the present invention, a position of an object within a left eye image or right eye image may be determined and corrected. For example, when the object's position exceeds a critical distance, a user experiences visual inconvenience due to a difference between positions of the object within the right eye and left eye images, respectively. Therefore, the present invention provides for a mobile terminal and controlling method thereof for enabling the respective positions of the object within the right eye and left eye images to be shifted within the critical distance automatically or according to the user's command input.

The present method can be performed via the following steps. First, the controller 180 searches for a same object within a left eye image and a right eye image. The same object may be searched by performing a block search algorithm, an object tracking algorithm or the like. Principles of the algorithms will be described in detail below.

Next, the controller 180 determines a distance difference between a position of the same object within the left image and a position of the same object within the right eye image. Finally, if the distance difference between the positions of the same object within the left eye and right eye images exceeds a predetermined critical value, the controller 180 corrects a position of the corresponding object in each of the left eye and right eye images to cause the distance difference to become equal to or less than the critical value. The controller 180 may then display each of the corrected images via the display unit.

The above described algorithm is merely exemplary, by which the present invention is non-limited. Alternatively, various types of algorithms may be used by the controller 180 to determine and correct a position of the same object within a left eye and right eye image.

In accordance with an embodiment of the present invention, a block search algorithm is described. The block search algorithm is a type of algorithm used by the controller 180 to search for the same object within a left eye image and a right eye image. According to the block search algorithm, each of the left eye image and the right eye image is searched for a block having a highest correlation there between. A displacement of the corresponding block is then determined. A process of searching for blocks having the highest correlation between the left eye and right eye images may be referred to as image estimation. A vector for estimating a motion of the corresponding block in each of the left eye and right eye images may be referred to as an estimation vector. This is described with reference to FIG. 9 as follows.

FIG. 9 illustrates a block search algorithm applicable to one embodiment of the present invention. FIG. 9(a) illustrates a left eye image for a left eye. Referring to FIG. 9(a), a left eye image can be divided into block units having a certain size. According to the block search algorithm, a macro block 920 including at least one portion of a specific object 910 may be a target of image estimation within a right eye image for a right eye, as shown in FIG. 9(b). As a result of a shift by a displacement corresponding to an estimation vector in the right eye image, the controller 180 may detect a block 930 of the right eye image most correlated to the macro block 920 of the left eye image.

The controller 180 may use the estimation vector to obtain coordinates of a corresponding object in each of the left eye and right eye images. Moreover, as mentioned in the foregoing description, in order to search the left eye image and the right eye image for the same object, the controller 180 may use an object tracking algorithm as well as the block search algorithm. According to the object tracking algorithm, an object is recognized in one of the left eye image or right eye image by feature-point extraction and the like. The recognized object is then tracked in the other of the left eye image or right eye image.

The controller 180 obtains the coordinates of the object in each of the left eye and right eye images using one of the above-mentioned algorithms. The controller 180 is also able to calculate a distance difference between the position of the object within the left eye image and the position of the object within the right eye image. This is explained with reference to FIG. 10 as follows.

Figure 10:
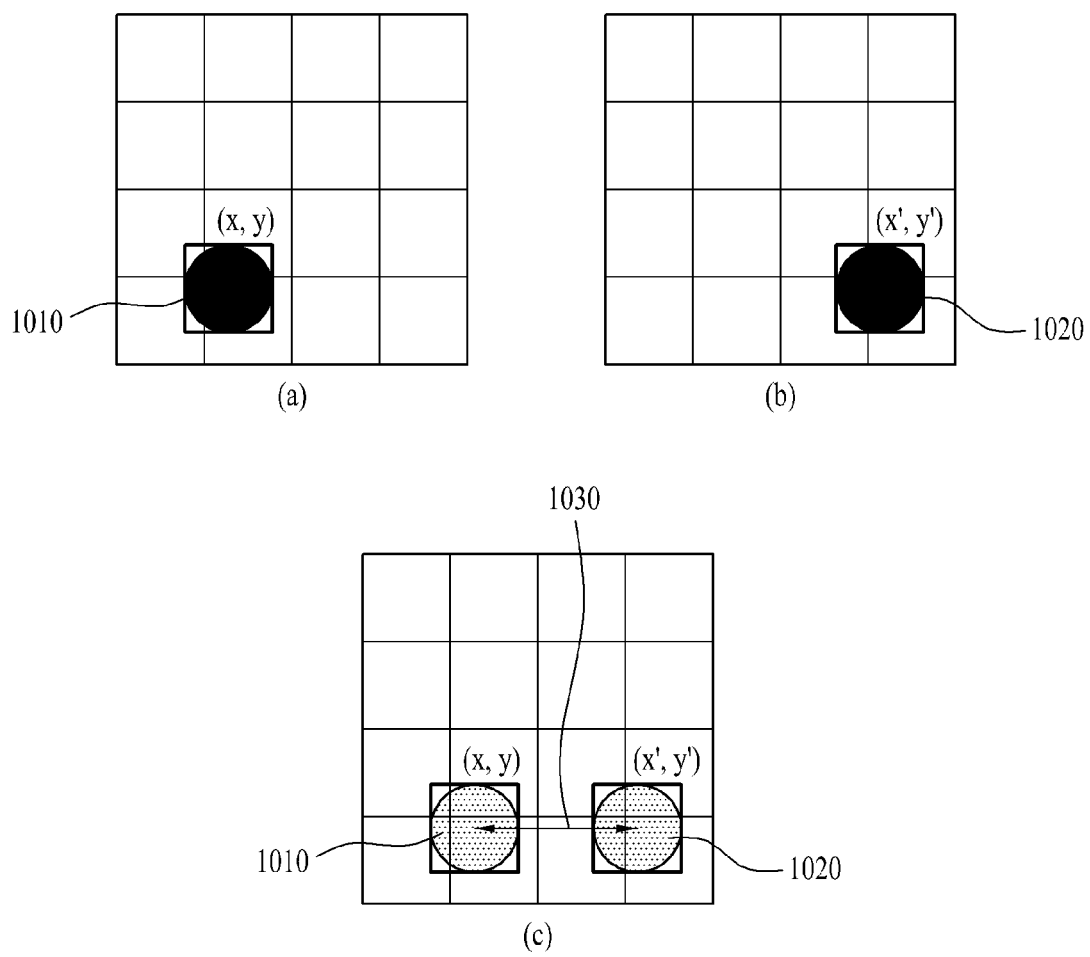
FIG. 10 illustrates a method of calculating an arranged distance difference between objects appearing in left and right eye images according to one embodiment of the present invention.

FIG. 10 illustrates a method of calculating a distance difference between a position of an object appearing in a left eye image and a position of an object appearing in a right eye image according to one embodiment of the present invention. FIG. 10(a) shows a left eye image, FIG. 10(b) shows a right eye image, and FIG. 10(c) shows an image resulting from combining the left eye and right eye images together.

Referring to FIG. 10, if coordinates of an object 1010 positioned in a left eye image correspond to (x, y) and coordinates of an object 1020 positioned in a right eye image correspond to (x', y'), a distance difference 1030 between the object appearing in the left eye image and the object appearing in the right eye image is equal to a square root of $(x'-x)^2+(y-y')^2$. If y is equal to y', the distance difference 1030 is equal to (x'-x).

Accordingly, in order to make the distance difference between the positions of the object in the respective left eye and right images become equal to or less than a critical value, a position of the object in each of the left eye and right images is corrected. Preferably, the positions of the object are moved by the same distance closer to a center in each of the left eye and right eye images, wherein the center is a central location between the position of the object in the left eye image and the position of the object in the right eye image.

For example, referring to FIG. 10(c), the center in each of the left eye and right images is equal to [(x−x')/2, (y−y')/2]. If the distance difference 1030 is 10, and a preset critical value is 7, it is preferable that the position of each of the objects in the respective left eye and right eye images is shifted toward the center by 1.5. In particular, if y is equal to y', the object 1010 positioned at the coordinates (x, y) is shifted toward the center, i.e., to the right in the left eye image. Hence, the position of the object 1010 in the corrected left eye image is [(x+1.5), y].

A method for applying the above described algorithms to a stereoscopic object shown in FIG. 8 is described with reference to FIG. 11 as follows. FIG. 11 illustrates display configurations for searching left and right eye images for the same object in a mobile terminal according to one embodiment of the present invention.

FIG. 11(a) shows blocks used in connection with the block search algorithm to detect a same object in an image resulting from overlapping a left eye image and a right eye image together. Referring to FIG. 11(b), a flowerpot object 1130 and a dish object 1140 are detected in the left eye image 1110 and the right eye image 1120 and displayed via the object tracking algorithm.

Once the positions of the objects are detected in the left eye and right eye images by one of the above described methods, respectively, position correction can be performed. As shown in FIG. 12, position correction is performed on the object whose distance difference between a position in the left eye image and a position in the right eye image exceeds a preset critical distance.

FIG. 12 illustrates a scheme for performing position correction according to one embodiment of the present invention. Referring to FIG. 12(a), the controller 180 determines whether a distance difference 1210 of the flowerpot object in each of the left eye and right eye images exceeds a preset critical value in the image resulting from combining the left eye image and the right eye image. The controller 180 also determines whether a distance difference 1220 of the dish object in each of the left eye and right eye images exceeds a preset critical value in the image resulting from combining the left eye image and the right eye image. Referring to FIG. 12(b), the controller 180 is able to correct each of the images to decrease a distance difference 1230 of the flowerpot object and a distance difference 1240 of the dish object. Therefore, the problem related to a user's visual discomfort and/or inconvenience due to an excessive distance difference is resolved.

The above-explained position correction example shown in FIG. 12 is further described with reference to FIG. 13 as follows. FIG. 13 illustrates a scheme for performing position correction according to one embodiment of the present invention.

Referring to FIG. 13(a), a triangle in each of a left eye image and a right eye image becomes a convergence object. Due to a position difference between a face shape appearing at a left portion of the left eye image and a face shape appearing at a right portion of the right eye image, a user is able to sense a stereoscopic effect with respect to the face shapes. However, when a distance 1310 between the face shapes in the left eye and right eye images exceeds a predetermined critical value, visual discomfort is experienced by the user. To relieve the user's discomfort, the respective face shapes in the left eye and right eye images can be shifted closer to the center in each of the images. By doing so, a distance 1320 between the face shapes is shortened to be less than the predetermined critical value, as shown in FIG. 13(b), thereby relieving the user of the visual discomfort.

In an embodiment of the present invention, image compensation according to position correction of an object is considered. Specifically, when a spaced distance exceeding a critical distance of the same object in each of a left eye image and a right eye image is adjusted according to one embodiment of the present invention, loss of, or loss to, an original image may occur due to a shift of the object. To solve this problem, an image loss compensating method according to an embodiment of the present will be described with reference to FIG. 14 as follows.

FIG. 14 illustrates a method of compensating an image according to an embodiment of the present invention. In FIG. 14, objects are arranged similar to the objects in FIG. 13. Referring to FIG. 14(a), as an object 1410 is shifted toward a center by a correcting method according to one embodiment of the present invention, a space 1420, corresponding to image information having a crescent moon shape may be lost. That is, a lost space is generated in a region not overlapped by a region occupied by the shifted object 1410.

Thus, if the lost space, from which the image information is lost, is displayed as is, image quality is degraded. Therefore, the present embodiment performs image compensation using image information from an opposing image corresponding to the lost space.

For example, image information having a crescent moon shape corresponding to the lost space 1420 generated in a left eye image, as shown in FIG. 14(a), may be retrieved from a right eye image and inserted into the lost space of the left eye image, as shown in FIG. 14(b). Conversely, a space lost in the right eye image may be filled with corresponding image information from the left eye image. Moreover, in case of video, image information corresponding to a lost space may be retrieved from a frame next or previous to a corresponding frame.

In accordance with another embodiment of the present invention, a method for optimizing a critical distance for a user will be described. Specifically, in the following description, a method of setting a critical distance per user will be explained with reference to FIG. 15.

FIG. 15 illustrates a method of measuring and setting a critical distance applicable to embodiments of the present invention.

Referring to FIG. 15, a user may perform a prescribed menu input via the user input 130 to enter a menu for measuring/setting a critical distance. If the menu is entered, both a left eye image 1510 and a right eye image 1520 may be displayed on the display unit 151 for measuring and/or setting a critical distance.

An object 1511 having a prescribed shape is displayed on each of the left eye image 1510 and the right eye image 1520. The user may then change a distance difference between a position of the object 1511 on the left eye image and a position of the object 1511 on the right eye image, as shown in FIGS. 15(a) and 15(b). While changing the distance difference between the positions of the object 1511 respectively displayed on the left eye image 1510 and the right eye image 1520, the user can measure/determine the distance difference on the display unit 151 at which visual discomfort is experienced by the user. Accordingly, the user may then set a critical value for the measured distance difference, via a prescribed menu manipulation, to avoid experiencing the visual discomfort.

In accordance with another embodiment of the present invention, a method for manual and automatic distance difference correction will be described. In this embodiment, the controller 180 determines/identifies an object whose distance difference between its position in a left eye image and its position in a right eye image exceeds a prescribed critical distance. The controller 180 then informs a user of the determined/identified object by displaying the determined/identified object on the display unit. Moreover, the controller 180 enables the user to select whether to perform distance difference correction on the determined/identified object. This embodiment will be explained with reference to FIG. 16 as follows.

FIG. 16 illustrates a method of correcting a stereoscopic image according to another embodiment of the present invention. In FIG. 16, a left eye image and a right eye image are overlapped with each other.

Referring to FIG. 16(a), the controller 180 determines/identifies objects 1610, 1620, of which a distance difference between a position of the respective object in the left eye image and a position of the respective object in the right eye image exceeds a prescribed critical distance. The determined/identified objects 1610, 1620 are displayed on the display unit 151 with a prescribed visual effect to help the user recognize the determined/identified objects 1610, 1620. Such a display function may be turned on through a prescribed menu setting if there exists an object causing visual discomfort to the user. Alternatively, such a display function can be executed only if the user manipulates a specific key button (e.g., a hardware key button, a virtual key button, etc.). Optionally, each of the determined/identified objects may be displayed with a different visual effect according to a 3D depth difference from a convergence point.

If the display unit 151 includes a touchscreen configured to recognize a user's touch input, the user may select one of the determined/identified objects using a finger 1630 or a stylus pen. If the display unit 151 does not include the touchscreen, the user may select one of the determined/identified objects by manipulating a cursor displayed on the display unit 151. If the object is selected, the controller 180 narrows the selected object's distance difference to within a preset critical distance range. Alternatively, if the object is selected, the controller 180 narrows the selected object's distance difference by a predetermined value each time the selection is made.

Referring to FIG. 16(b), if the determined/identified object is selected, a menu window 1640 is displayed for enabling a user to select automatic distance difference correction (Auto) or manual distance difference correction (Manual). If automatic distance difference correction is selected, the distance difference between the position of the selected object in the left eye image and the position of the selected object in the right eye image is narrowed to within the preset critical distance. If manual distance difference correction is selected, the distance difference between the position of the selected object in the left eye image and the position of the selected object in the right eye image is narrowed by a predetermined value each time the selection is made. Alternatively, a scroll bar 1650 configured to adjust an extent of narrowing the distance difference may be displayed, as shown in FIG. 16(c).

Moreover, in accordance with the embodiment, after an image prior to the correction of the left eye and right eye images is displayed on the display unit, a corrected image may be displayed while a user input unit, such as a specific hardware key button or specific virtual key button, is manipulated. Such a function may be referred to as a corrected image preview function.

An example of a type of setting menu configuration for setting the above-mentioned methods of correcting a stereoscopic image is described with reference to FIG. 17. FIG. 17 illustrates an example of a menu screen for setting a method of correcting a stereoscopic image applicable to embodiments of the present invention.

Referring to FIG. 17, menus for setting a stereoscopic image correcting method can include an automatic or auto correction menu, an auto correction distance menu, a total collective correction menu, a manual correction step menu, a convergence point display menu and the like.

The auto correction menu is a menu for setting a function for automatically narrowing a distance difference between a position of an object displayed in a left eye image and a position of the object displayed in a right eye image to within a critical distance range, wherein the pre-narrowed distance difference exceeds a preset critical distance.

The auto correction distance menu is a menu for setting the above-mentioned preset critical distance. The audio correction distance menu is set by the method described with reference to FIG. 15, or can be set directly by user input.

If the distance difference is automatically narrowed to within the critically distance range, the total collective correction menu allows for the application of a narrowing ratio to all displayed objects except for the object whose distance difference exceeds the preset critical distance. Accordingly, the 3D depth of the object whose distance difference exceeds the preset critical distance and the 3D depths of all objects except a convergence object can be adjusted in proportion to the 3D depth of an object having a maximally adjustable 3D depth.

If the user selects manual distance difference correction, as shown in FIG. 16(a) or 16(b), the manual correction step menu of FIG. 17 sets an extent of narrowing the distance difference each time a selection is made. The convergence point display menu is a menu for providing a prescribed visual effect to a convergence point in order to provide a user with a reference point of the distance difference correction.

The above-described menu configurations and names are merely exemplary, by which the present invention is non-limited. Various types of menu configurations and names may be applicable to the present invention.

In addition, the above-described methods can be implemented in a program recorded medium as computer-readable codes. The computer-readable media include all types of recording devices in which data readable by a computer system is stored. The computer-readable media include ROM, RAM, CD-ROM, magnetic tapes, floppy discs, optical data storage devices, and the like for example and also include carrier-wave type implementations (e.g., transmission via Internet).

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A mobile terminal comprising:
a controller;
a user input unit; and
a display configured to display a stereoscopic image,
wherein the controller is configured to:
cause the display to display the stereoscopic image comprising a first image provided to a left eye of a user and a second image provided to a right eye of the user;
search for a plurality of objects within the first image and the second image, wherein each of the plurality of objects is correspondingly present in both the first image and in the second image to form a stereoscopic image of each object;
calculate a separation distance for each object of the plurality of objects, the separation distance corresponding to a distance between a position of each object of the plurality of objects of the first image and a position of the corresponding each object of the plurality of objects of the second image when the first and second images are overlapped;
change only a position of a selected object of the plurality of objects of each of the first and second images in response to a selection input received via the user input unit selecting the selected object, to decrease the separation distance for the selected object by a predetermined distance;
change only the position of the selected object of each of the first and second images again to decrease the separation distance for the selected object by the predetermined distance in response to each of a plurality of additional selection inputs selecting the selected object;
insert a first portion of the first image into the second image, wherein the first portion comprises image information at a position of the first image which corresponds to an original position of the selected object of the second image;
insert a second portion of the second image into the first image, wherein the second portion comprises image information at a position of the second image which corresponds to an original position of the selected object of the first image; and
cause the display to display the changed first and second images.

2. The mobile terminal of claim 1, wherein the display comprises an image displaying means and a parallax generating means provided over the image displaying means to change at least one of a propagation direction and a vibration direction of a light generated from the image displaying means.

3. The mobile terminal of claim 1, wherein the controller is further configured to search for the plurality of objects by a block search algorithm or an object tracking algorithm.

4. The mobile terminal of claim 1, wherein the controller is further configured to change the position of the selected object of each of the first and second images by moving the selected object closer by a set distance to a center point between a position of the selected object of the first image and a position of the selected object of the second image when the first and second images are overlapped.

5. The mobile terminal of claim 1, wherein the controller is further configured to cause the display to display the selected object of each of the first and second images with a prescribed visual effect before changing the position of the selected object.

6. The mobile terminal of claim 5, wherein the controller is further configured to cause the display to display a menu window proximate to the selected object, the menu window including a selectable manual setting to change the position of the selected object of each of the first and second images manually and a selectable automatic setting to change the position of the selected object of each of the first and second images automatically.

7. The mobile terminal of claim 6, wherein the controller is further configured to cause the display to display a scroll bar for adjusting a distance of the position change of the selected object of each of the first and second images when the manual setting is selected.

8. The mobile terminal of claim 6, wherein the controller is further configured to change the position of the selected object of each of the first image and second image when automatic setting is selected, such that the separation distance is less than the threshold value.

9. The mobile terminal of claim 5, wherein:
the controller is further configured to cause the display to display a convergence object at a first position in the first image and at a second position in the second image,
the first position and second position are congruent when the first and second image are overlapped, and
the convergence object is displayed with a different prescribed visual effect according to a stereoscopic effect level of the selected object.

10. The mobile terminal of claim 1, wherein the threshold value is a distance corresponding to a binocular interval of the user.

11. A method of controlling a mobile terminal, the method comprising:
displaying a stereoscopic image comprising a first image provided to a left eye of a user and a second image provided to a right eye of the user;
searching for a plurality of objects within the first image and the second image, wherein each of the plurality of objects is correspondingly present in both the first image and in the second image to form a stereoscopic image of each object;
calculating a separation distance for each object of the plurality of objects, the separation distance corresponding to a distance between a position of each object of the plurality of objects of the first image and a position of the corresponding each object of the plurality of objects of the second image when the first and second images are overlapped;
changing only a position of a selected object of the plurality of objects of each of the first and second images in response to a selection input received via a user input unit selecting the selected object, to decrease the separation distance for the selected object by a predetermined distance;
changing only the position of the selected object of each of the first and second images again to decrease the separation distance for the selected object by the predetermined distance in response to each of a plurality of additional selection inputs selecting the selected object;
inserting a first portion of the first image into the second image, wherein the first portion comprises image information at a position of the first image which corresponds to an original position of the selected object of the second image;
inserting a second portion of the second image into the first image, wherein the second portion comprises image information at a position of the second image which corresponds to an original position of the selected object of the first image; and
displaying the changed first and second images on the display.

12. The method of claim 11, further comprising searching for the plurality of objects by a block search algorithm or an object tracking algorithm.

13. The method of claim 11, further comprising moving the selected object of each of the first and second images closer by a set distance to a center point between a position of the selected object of the first image and a position of the selected object of the second image when the first and second images are overlapped.

14. The method of claim 11, further comprising displaying the selected object of each of the first and second images with a prescribed visual effect before changing the position of the at selected object.

15. The method of claim 11, wherein the threshold value is a distance corresponding to a binocular interval of a user.

* * * * *